US012023924B2

(12) United States Patent
Tomizawa et al.

(10) Patent No.: US 12,023,924 B2
(45) Date of Patent: Jul. 2, 2024

(54) LIQUID EJECTION APPARATUS AND CONTROL METHOD

(71) Applicant: CANON KABUSHIKI KAISHA, Tokyo (JP)

(72) Inventors: Keiji Tomizawa, Kanagawa (JP); Yoshinori Misumi, Tokyo (JP); Yuzuru Ishida, Kanagawa (JP); Shuzo Iwanaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 17/899,768

(22) Filed: Aug. 31, 2022

(65) Prior Publication Data

US 2023/0070795 A1 Mar. 9, 2023

(30) Foreign Application Priority Data

Sep. 8, 2021 (JP) ................................ 2021-146463

(51) Int. Cl.
*B41J 2/14* (2006.01)
*B41J 2/045* (2006.01)

(52) U.S. Cl.
CPC ....... *B41J 2/14088* (2013.01); *B41J 2/04538* (2013.01); *B41J 2/0458* (2013.01); *B41J 2/14072* (2013.01)

(58) Field of Classification Search
CPC .................................................... B41J 2/14088
See application file for complete search history.

(56) References Cited

U.S. PATENT DOCUMENTS

| | | | |
|---|---|---|---|
| 5,536,093 | A | 7/1996 | Tomoda et al. |
| 5,741,080 | A | 4/1998 | Tomoda et al. |
| 5,877,784 | A | 3/1999 | Maru et al. |
| 6,022,092 | A | 2/2000 | Misumi |
| 6,243,109 | B1 | 6/2001 | Ishinaga et al. |
| 6,467,894 | B1 | 10/2002 | Misumi |
| 6,505,903 | B2 | 1/2003 | Ishinaga et al. |
| 6,520,611 | B2 | 2/2003 | Ishinaga et al. |
| 6,994,417 | B2 | 2/2006 | Murayama et al. |
| 7,556,330 | B2 | 7/2009 | Saito et al. |

(Continued)

FOREIGN PATENT DOCUMENTS

| | | | |
|---|---|---|---|
| JP | 2008-105364 | A | 5/2008 |
| JP | 2014-131867 | A | 7/2014 |
| JP | 2019-038127 | A | 3/2019 |

*Primary Examiner* — Sharon Polk
(74) *Attorney, Agent, or Firm* — Venable LLP

(57) ABSTRACT

One embodiment of the present invention is a liquid ejection apparatus having: a liquid ejection head including a heating element, a first protection layer that blocks contact between the heating element and liquid, a second protection layer that partially covers the first protection layer and functions as a first electrode, a second electrode that is electrically connected to the first electrode through the liquid, and an ejection port that ejects the liquid; and a control unit configured to perform control of setting a potential difference between the first electrode and the second electrode to a predetermined value in each of aging and printing by changing at least one of potentials of the first electrode and the second electrode, wherein $\Delta Va \neq \Delta Vp$ is satisfied in the case where the potential difference in the aging is represented by $\Delta Va$ and the potential difference in the printing is represented by $\Delta Vp$.

16 Claims, 21 Drawing Sheets

(56) References Cited

U.S. PATENT DOCUMENTS

| | | | | |
|---|---|---|---|---|
| 7,695,088 | B2 | 4/2010 | Yamane et al. | |
| 7,950,769 | B2 | 5/2011 | Sakai et al. | |
| 8,123,330 | B2 | 2/2012 | Sakai et al. | |
| 8,287,091 | B2 | 10/2012 | Kyoshima et al. | |
| 8,342,631 | B2 | 1/2013 | Kyoshima et al. | |
| 8,491,087 | B2 | 7/2013 | Sakai et al. | |
| 8,985,721 | B2 | 3/2015 | Tomizawa et al. | |
| 9,266,325 | B2 | 2/2016 | Tomizawa et al. | |
| 9,975,347 | B2 | 5/2018 | Tozuka et al. | |
| 10,308,018 | B2 | 6/2019 | Miura et al. | |
| 10,350,885 | B2 | 7/2019 | Aoki et al. | |
| 10,710,361 | B2 | 7/2020 | Misumi et al. | |
| 10,994,532 | B2 | 5/2021 | Ishida et al. | |
| 11,648,777 | B2 * | 5/2023 | Misumi | B41J 2/1404 347/22 |
| 2007/0146428 | A1 | 6/2007 | Sakai et al. | |
| 2008/0134967 | A1 | 6/2008 | Udagawa et al. | |
| 2011/0199421 | A1 | 8/2011 | Sakai et al. | |
| 2012/0105537 | A1 | 5/2012 | Sakai et al. | |
| 2014/0152725 | A1 | 6/2014 | Tomizawa et al. | |
| 2019/0061343 | A1 | 2/2019 | Misumi et al. | |
| 2023/0007995 | A1 * | 1/2023 | Hamada | B41J 2/1404 |

* cited by examiner

LIQUID EJECTION APPARATUS AND CONTROL METHOD

BACKGROUND

Field

The present disclosure relates to a liquid ejection apparatus including a liquid ejection head that ejects liquid such as inks.

Description of the Related Art

Since an inkjet recording method among recording methods employed in recording apparatuses such as a multi-function printer is a non-impact recording method and enables recording at high density and high speed with low noise, this method is widely employed. An inkjet recording apparatus includes a mechanism that drives a carrier on which an inkjet head is mounted, a conveyance mechanism that conveys a recording medium such as recording paper, and a control configuration that controls these mechanisms. Note that, in the present specification, the inkjet head is simply referred to as "(recording) head". Moreover, a head that ejects liquid such as an ink is referred to as "liquid ejection head".

Methods of generating energy for ejecting an ink from an ejection port of the recording head include a method in which pressure is applied to the ink by using an electromechanical conversion element such as a piezoelectric element and a method in which bubbling is caused by using heat generated by irradiation of an electromagnetic wave such as laser and pressure of air bubbles is used. Moreover, there is a method in which an electrothermal conversion element (hereinafter, referred to as "heater") including a heating resistive element heats the ink to cause bubbling.

In a recording head using this heater, kogation of the ink is formed on a surface of the heater due to heating of the ink by the heater and ejection speed greatly changes in some cases. Many of the inks used in such a recording head are inks including dye-based colorants and pigment-based colorants and many of these colorants are insoluble or hardly soluble to water. It is said that insoluble or hardly soluble substances thus form kogation on the aforementioned heater and ejection characteristics thereby tend to change.

It is known that, in the case where an ink that is likely to form kogation as described above is ejected in a situation where there is almost no kogation on a heater surface layer such as in attachment of the head, ejection characteristics in an initial stage greatly change (for example, ejection speed drops) as a result of formation of kogation on the heater. This change of ejection characteristics in the initial stage may cause image defects and, for example, defects such as thin lines, quality deterioration of letters, and a change in tint due to landing position misalignment occurs.

To counter this problem, Japanese Patent Laid-Open No. 2014-131867 proposes a technique in which a preliminary ink ejection process (hereinafter, referred to as aging) that does not contribute to recording on a paper surface is preformed in advance before the recording on the paper surface. A certain degree of kogation of an ink is formed on a heater surface by aging, kogation on the heater surface is made even (attachment and detachment of kogation is made to be in a substantially equilibrium state), and the heater surface is stabilized to suppress changes in the ejection characteristics in the initial stage.

Moreover, Japanese Patent Laid-Open No. 2008-105364 proposes a head including an upper protection layer in a region including a heat applying portion of a heater, the upper protection layer arranged to be capable of being electrically connected to serve as an electrode for causing electrochemical reaction with an ink.

Moreover, Japanese Patent Laid-Open No. 2019-38127 proposes a liquid ejection head including an upper protection layer that covers a portion of a heater to be heated and that is used as one electrode and an opposing electrode that is connected to the one electrode through liquid. The liquid ejection head of Japanese Patent Laid-Open No. 2019-38127 includes a potential control unit that generates an electric field between the upper protection layer electrode and the opposing electrode, and a potential of the opposing electrode is set higher than a potential of the upper protection layer electrode in normal printing to make kogation less likely to attach to the upper protection layer.

SUMMARY

However, the aforementioned patent literatures have the following problems. In detail, in the case where a pulse with a higher voltage value than a voltage pulse used for normal application in recording or the like is applied or a pulse is applied to a recording element for longer time than time at which the pulse is normally applied to accelerate aging, problems occur. In this case, since excessive energy is applied to a heater material to which power is fed, there is a risk that the heater material is damaged and the life is reduced.

Moreover, the head that is provided with the opposing electrode and that performs the potential control of making kogation less likely to attach to the heater surface layer has a problem that, in the state where there is almost no kogation on the heater surface layer, the ejection characteristics are less likely to change and the aging takes time. An increase in aging time leads to increases in downtime and wasted inks.

Accordingly, in view of the aforementioned problems, an object of the present disclosure to quickly complete aging while suppressing damage on a heater material.

One embodiment of the present invention is a liquid ejection apparatus including: a liquid ejection head including a heating element that generates energy required to eject liquid, a first protection layer that blocks contact between the heating element and the liquid, a second protection layer that partially covers the first protection layer and functions as a first electrode, a second electrode that is electrically connected to the first electrode through the liquid, and an ejection port that ejects the liquid; and a control unit configured to perform control of setting a potential difference between the first electrode and the second electrode to a predetermined value in each of aging and printing by changing at least one of potentials of the first electrode and the second electrode, wherein $\Delta Va \neq \Delta Vp$ is satisfied in the case where the potential of the first electrode in the aging is represented by Vah, the potential of the second electrode in the aging is represented by Vac, and the potential difference between the potential Vah of the first electrode and the potential Vac of the second electrode is represented by $\Delta Va$ (=Vac−Vah), and the potential of the first electrode in the printing is represented by Vph, the potential of the second electrode in the printing is represented by Vpc, and the potential difference between the potential Vph of the first electrode and the potential Vpc of the second electrode is represented by as $\Delta Vp$ (=Vpc−Vph).

Further features of the present invention will become apparent from the following description of exemplary embodiments with reference to the attached drawings.

DESCRIPTION OF THE EMBODIMENTS

Embodiments of the present disclosure are described below by using the drawings. However, the following description does not needlessly limit the scope of the present disclosure. In the following description, a liquid ejection apparatus including a so-called line-type head having a length corresponding to a width of a recording medium is described as an example but the idea of the present disclosure can be applied also to a so-called serial-type liquid ejection apparatus that performs recording while scanning the recording medium. A configuration in which one recording element board for a black ink and one recording element board for color inks are mounted can be given as an example of the configuration of the serial-type liquid ejection apparatus. However, the present disclosure is not limited to this mode and may be applied to a mode as follows: a short line head that has a smaller width than the recording medium and in which several recording element boards are arranged such that ejection ports overlap one another in an ejection port row direction is fabricated and are made to scan the recording medium. Moreover, although the recording apparatus of the present embodiment is a circulating-type inkjet recording apparatus in which liquid such as an ink is circulated between a tank and the liquid ejection apparatus, the mode of the recording apparatus may be a non-circulating-type mode.

First Embodiment

<Inkjet Recording Apparatus>

Figure 1:
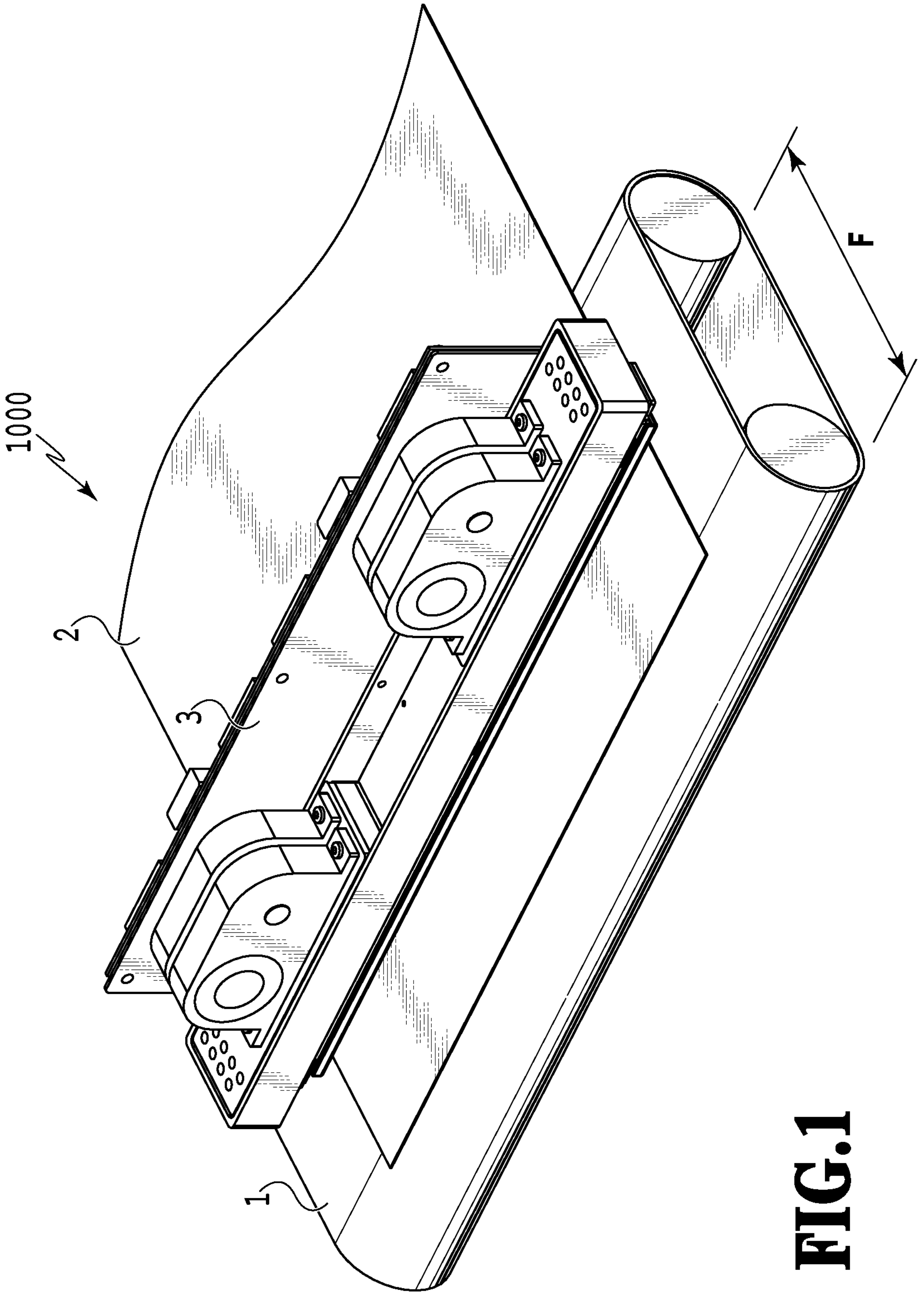
FIG. 1 is a view illustrating a schematic configuration of a recording apparatus.

FIG. 1 illustrates a schematic configuration of a liquid ejection apparatus according to the present embodiment, specifically an inkjet recording apparatus 1000 (hereinafter, also referred to as recording apparatus) that performs recording by ejecting inks. The recording apparatus 1000 includes a conveyance unit 1 that conveys recording media 2 and a line-type liquid ejection head 3 that is arranged to be substantially orthogonal to a conveyance direction of the recording medium, and is a line-type recording apparatus that performs continuous recording in one pass while continuously or intermittently conveying multiple recording media 2. The recording media 2 are not limited to cut paper and may be continuous roll paper. The liquid ejection head 3 is capable of performing full color printing by using cyan, magenta, yellow, and black (CMYK) inks. In the liquid ejection head 3, a main tank, a buffer tank, and a liquid supplying unit that forms a supply passage for supplying the inks to the liquid ejection head as described later are fluidly connected to one another (see FIG. 2). Moreover, an electric control unit that sends electric power and ejection control signals to the liquid ejection head 3 is electrically connected to the liquid ejection head 3. Liquid paths and electrical signal paths in the liquid ejection head 3 are described later.

<First Circulation Path>

Figure 2:
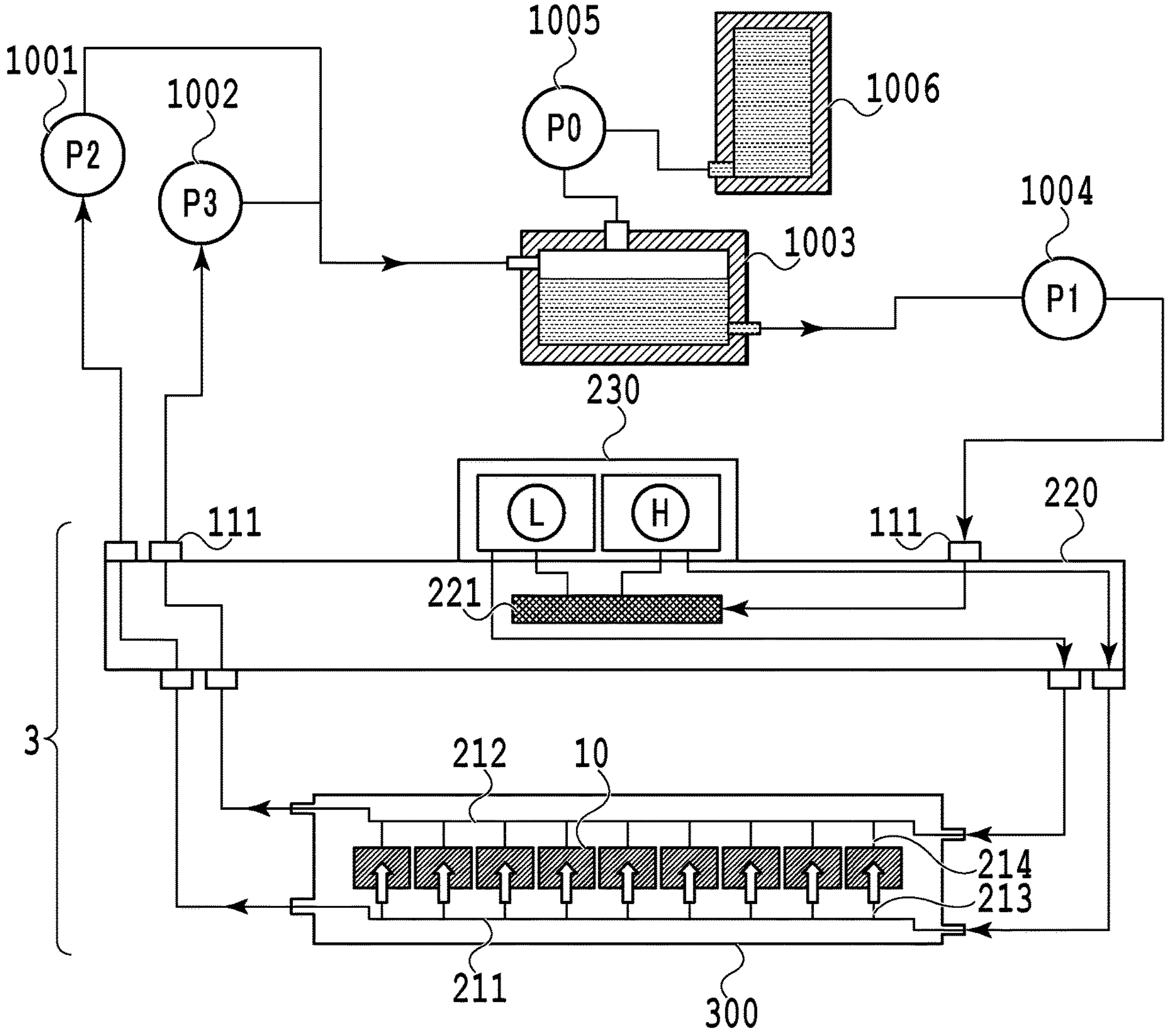
FIG. 2 is a schematic view illustrating a first circulation path.

FIG. 2 is a schematic view illustrating a first circulation path as one mode of a circulation path applied to the recording apparatus according to the present embodiment. As illustrated in FIG. 2, the liquid ejection head 3 is fluidly connected to a first circulation pump (high pressure side) 1001, a first circulation pump (low pressure side) 1002, a buffer tank 1003, and the like. Although a path in which only one of the CMYK inks flows is illustrated in FIG. 2 to simplify the explanation, circulation paths for the four colors are actually provided in the liquid ejection head 3 and a recording apparatus main body.

The buffer tank 1003 that is connected to a main tank 1006 and that serves as a sub tank has an atmosphere communication port (not illustrated) that allows the inside and the outside of the tank to communicate with each other, and air bubbles in the ink can be discharged to the outside. The buffer tank 1003 is also connected to a replenishing pump 1005. In the case where the ink is consumed in the liquid ejection head 3, the replenishing pump 1005 transfers the ink equivalent to a consumed amount from the main tank 1006 to the buffer tank 1003. The ink is consumed in the liquid ejection head 3, for example, in the case where the ink is ejected (discharged) from the ejection port of the liquid ejection head in operations such as recording and suction recovery performed by ejecting the ink.

The two first circulation pumps 1001 and 1002 have a role of pumping out the ink from liquid connecting portions 111 of the liquid ejection head 3 and causing the ink to flow to the buffer tank 1003. The first circulation pumps are each preferably a displacement pump that has a quantitative liquid sending capability. Specifically, a tube pump, a gear pump, a diaphragm pump, a syringe pump, and the like can be given as examples. For example, a mode of securing a constant flow rate by arranging a general constant flow rate valve or a relief valve at a pump outlet may also be used. In driving of the liquid ejection head 3, the first circulation pump (high pressure side) 1001 and the first circulation pump (low pressure side) 1002 cause the ink to flow at a constant rate in each of a common supply flow passage 211 and a common collection flow passage 212. The flow rate is preferably set equal to or higher than such a flow rate that temperature differences among recording element boards 10 in the liquid ejection head 3 is at a level at which recorded image quality is not affected. However, in the case where an excessively high flow rate is set, negative pressure differences among the recording element boards 10 become too large due to an effect of pressure droplet in flow passages in a liquid ejection unit 300, and image density unevenness occurs. Accordingly, it is preferable to set the flow rate while taking the temperature differences and the negative pressure differences among the recording element boards 10 into consideration.

A negative pressure control unit 230 is provided in the middle of a path connecting a second circulation pump 1004 and the liquid ejection unit 300. Accordingly, the negative pressure control unit 230 has a function of operating such that pressure downstream (that is, on the liquid ejection unit 300 side) of the negative pressure control unit 230 is maintained at a preset constant pressure even in the case where the flow rate in a circulation system fluctuates due to a difference in duty of recording. Any mechanisms can be used as two pressure adjustment mechanisms that form the negative pressure control unit 230 as long as they can control the pressure downstream of the negative pressure control unit 230 such that the pressure fluctuates within a certain range centered at a desired set pressure. For example, a mechanism similar to a so-called "depressurization regulator" can be used. In the case where the depressurization regulator is used, as illustrated in FIG. 2, the second circulation pump 1004 preferably applies pressure on the upstream side of the negative pressure control unit 230 via a liquid supply unit 220. Since this configuration can suppress an effect of a hydraulic head pressure of the buffer tank 1003 on the liquid ejection head 3, a degree of freedom in layout of the buffer tank 1003 in the recording apparatus 1000 can be improved. The second circulation pump 1004 only needs to be a pump that has a lifting range pressure of a certain pressure or higher in a range of an ink circulation flow rate used in the drive of the liquid ejection head 3, and a turbo pump, a displacement pump, or the like can be used. Specifically, a diaphragm pump or the like can be applied. Moreover, for example, a hydraulic head tank arranged to have a certain hydraulic head difference with respect to the negative pressure control unit 230 can be applied instead of the second circulation pump 1004.

As illustrated in FIG. 2, the negative pressure control unit 230 includes the two pressure adjustment mechanisms for which different control pressures are set, respectively. A pressure adjustment mechanism on the higher pressure setting side (denoted by H in FIG. 2) out of the two negative pressure adjustment mechanisms is connected to the common supply flow passage 211 in the liquid ejection unit 300 via an interior of the liquid supply unit 220. Meanwhile, a pressure adjustment mechanism on the lower pressure setting side (denoted by L in FIG. 2) is connected to the common collection flow passage 212 via the interior of the liquid supply unit 220.

The liquid ejection unit 300 is provided with the common supply flow passage 211, the common collection flow passage 212, and individual supply flow passages 213 and individual collection flow passages 214 that communicate with the recording element boards 10. Since the individual supply flow passages 213 and the individual collection flow passages 214 communicate with the common supply flow passage 211 and the common collection flow passage 212, there is generated a flow (arrows in FIG. 2) in which part of the ink flows from the common supply flow passage 211 to the common collection flow passage 212 while passing through internal flow passages of the recording element board 10. The reason for this is that, since the pressure adjustment mechanism H is connected to the common supply flow passage 211 and the pressure adjustment mechanism L is connected to the common collection flow passage 212, a differential pressure is generated between the two common flow passages.

As described above, in the liquid ejection unit 300, the flow in which part of the ink passes through interiors of the recording element boards 10 is generated while the ink flows to pass through interiors of the common supply flow passage 211 and the common collection flow passage 212. Accordingly, the flow through the common supply flow passage 211 and the common collection flow passage 212 allows heat generated in the recording element boards 10 to be discharged to the outside of the recording element boards 10. Moreover, since such a configuration can generate a flow of ink also in ejection ports and pressure chambers not performing recording while the liquid ejection head 3 performs the recording, an increase in the viscosity of the ink in such portions can be suppressed. Furthermore, the ink with increased viscosity and foreign objects in the ink can be discharged to the common collection flow passage 212. Accordingly, the liquid ejection head 3 of the present embodiment can perform high-quality recording at high speed.

<Second Circulation Path>

Figure 3:
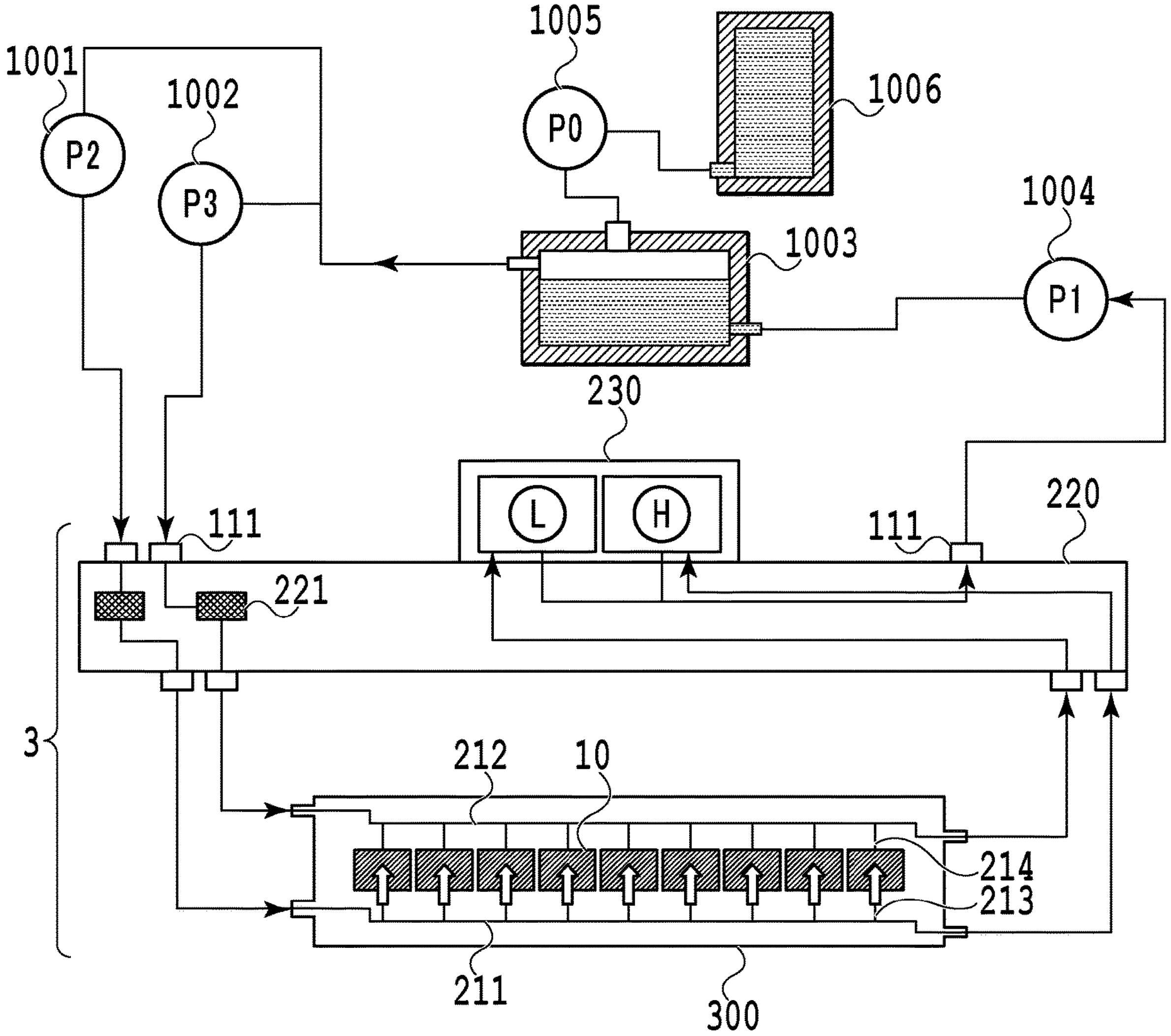
FIG. 3 is a schematic view illustrating a second circulation path.

FIG. 3 is a schematic view illustrating a second circulation path different from the aforementioned first circulation path among circulation paths applied to the recording apparatus according to the present embodiment. Main differences from the first circulation path are as follows.

First, the two pressure adjustment mechanisms forming the negative pressure control unit 230 both have mechanisms (mechanism parts having the same functions as so-called "backpressure regulator") that control a pressure upstream of the negative pressure control unit 230 such that the pressure fluctuates within a certain range centered at a desired set pressure. Moreover, the second circulation pump 1004 functions as a negative pressure source that reduces pressure on the downstream side of the negative pressure control unit 230. Furthermore, the first circulation pump (high pressure side) 1001 and the first circulation pump (low pressure side) 1002 are arranged upstream of the liquid ejection head and the negative pressure control unit 230 is arranged downstream of the liquid ejection head.

The negative pressure control unit 230 in the second circulation path operates such that pressure upstream (that is, on the liquid ejection unit 300) of the negative pressure control unit 230 fluctuates within the certain range even in the case where a flow rate fluctuates due to changes in recording duty in the case where the liquid ejection head 3 performs the recording. The pressure fluctuates within, for example, a certain range centered at a preset pressure. As illustrated in FIG. 3, the second circulation pump 1004 preferably applies pressure on the downstream side of the negative pressure control unit 230 via the liquid supply unit 220. Since this configuration can suppress an effect of a hydraulic head pressure of the buffer tank 1003 on the liquid ejection head 3, a degree of freedom in layout of the buffer tank 1003 in the recording apparatus 1000 can be improved. For example, a hydraulic head tank arranged to have a certain hydraulic head difference with respect to the negative pressure control unit 230 can be applied instead of the second circulation pump 1004.

As in the first circulation path, the negative pressure control unit 230 illustrated in FIG. 3 includes two pressure adjustment mechanisms for which different control pressures are set, respectively. A pressure adjustment mechanism on the higher pressure setting side (denoted by H in FIG. 3) out of the two pressure adjustment mechanisms is connected to the common supply flow passage 211 in the liquid ejection unit 300 via the interior of the liquid supply unit 220. Meanwhile, a pressure adjustment mechanism on the lower pressure setting side (denoted by L in FIG. 3) is connected to the common collection flow passage 212 via the interior of the liquid supply unit 220.

The two pressure adjustment mechanisms make the pressure in the common supply flow passage 211 higher than the pressure in the common collection flow passage 212. This configuration generates an ink flow in which the ink flows from the common supply flow passage 211 to the common collection flow passage 212 via the individual flow passages 213 and the internal flow passages of the recording element boards 10 (arrows in FIG. 3). As described above, in the second circulation path, an ink flow state similar to that in the first circulation path is obtained in the liquid ejection unit 300. Meanwhile, the second circulation path has two advantages different from those of the first circulation path.

The first advantage is as follows: in the second circulation path, since the negative pressure control unit 230 is arranged downstream of the liquid ejection head 3, a risk that dusts and foreign objects generated in the negative pressure control unit 230 flow into the head is low. The second advantage is as follows: the maximum value of the flow rate necessary for supplying from the buffer tank 1003 to the liquid ejection head 3 in the second circulation path is smaller than that in the first circulation path. The reason for this is as follows. A total of the flow rates in the common supply flow passage 211 and the common collection flow passage 212 in the case where the ink is circulated in a recording standby period is referred to as A. The value of A is defined as the minimum flow rate necessary to cause the temperature difference in the liquid ejection unit 300 to fall within the desired range in the case where the temperature of the liquid ejection head 3 is adjusted during the recording standby period. Moreover, an ejection flow rate in the case where the ink is ejected from all ejection ports in the liquid ejection unit 300 (all ejection) is defined as F. Then, in the case of the first circulation path (FIG. 2), a set flow rate of the first circulation pump (high pressure side) 1001 and the first circulation pump (low pressure side) 1002 is A. Accordingly, the maximum value of the liquid supply rate to the liquid ejection head 3 necessary in the all ejection is A+F.

Meanwhile, in the case of the second circulation path (FIG. 3), the liquid supply rate to the liquid ejection head 3 necessary in the recording standby period is the flow rate A. The supply rate to the liquid ejection head 3 necessary in the all ejection is the flow rate F. Then, in the case of the second circulation path, the total value of the set flow rates of the first circulation pump (high pressure side) 1001 and the first circulation pump (low pressure side) 1002, that is the maximum value of the necessary supply flow rate is a value of the larger one of A and F. Accordingly, the maximum value (A or F) of the necessary supply rate in the second circulation path is inevitably smaller than the maximum value (A+F) of the necessary supply flow rate in the first circulation path, provided that the liquid ejection unit 300 with the same configuration is used. In the case of the second circulation path, the degree of freedom in applicable circulation pumps is thus improved. Accordingly, for example, it is possible to use low-cost circulation pumps with simple configurations or reduce load of a cooler (not illustrated) installed in a path on the main body side and the second circulation path has an advantage of enabling cost reduction of the recording apparatus main body. This advantage is greater in line heads in which the value of A or F is relatively large, and, among the line heads, a line head with a large length in the longitudinal direction benefits more.

However, the first circulation path also has advantages over the second circulation path. Specifically, in the second circulation path, since the flow rate of the ink flowing in the liquid ejection unit 300 is maximum in the recording standby period, the lower the recording duty is, the higher the negative pressure applied to each nozzle is. Accordingly, particularly in the case where the flow passage widths (lengths in the direction orthogonal to the flow direction of the ink) of the common supply flow passage 211 and the common collection flow passage 212 are reduced to reduce a head width (length of the liquid ejection head in the direction of the shorter side), a high negative pressure is applied to the nozzle in a low duty image in which unevenness tends to be noticeable. Such application of a high negative pressure may increase effects of satellite droplets. Meanwhile, in the first circulation path, since the timing at which a high negative pressure is applied to the nozzle is in formation of a high duty image, there is such an advantage that, even in the case where satellite droplets are generated, the satellite droplets are less noticeable and effects thereof on the recorded image are small. A preferable one of the two circulation paths can be selected and employed depending on the specifications (ejection flow rate F, minimum circulation flow rate A, and in-head flow passage resistance) of the liquid ejection head and the recording apparatus main body.

<Configuration of Liquid Ejection Head>

Figure 4A:
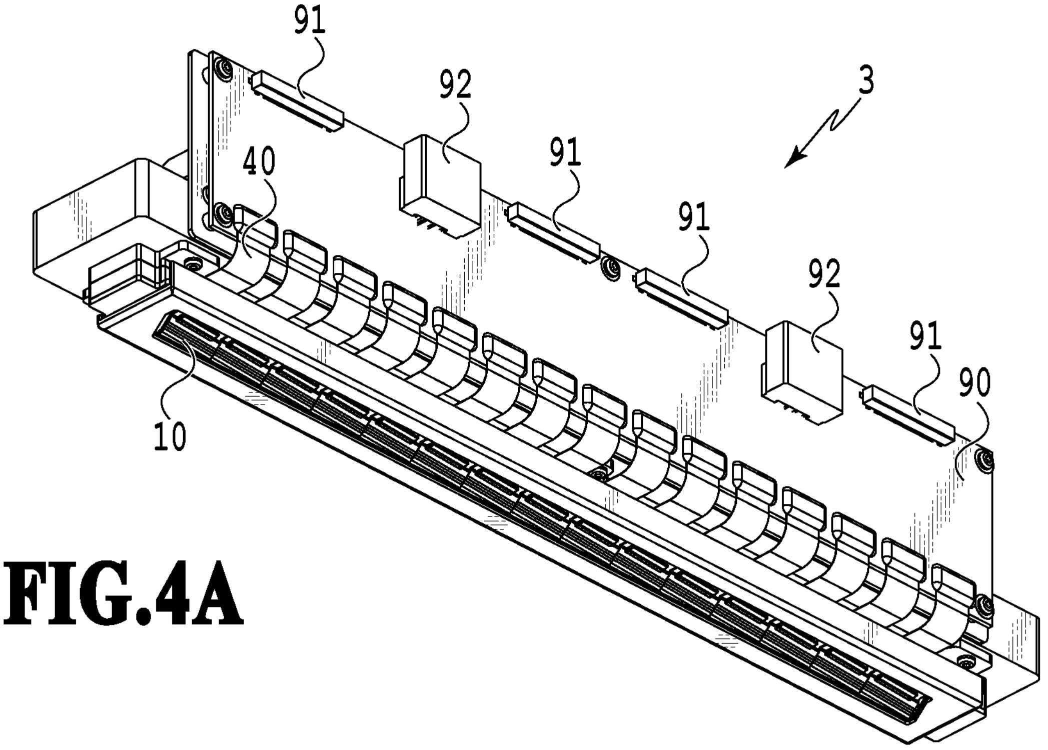
FIGS. 4A and 4B are perspective views of a liquid ejection head.
Figure 4B:
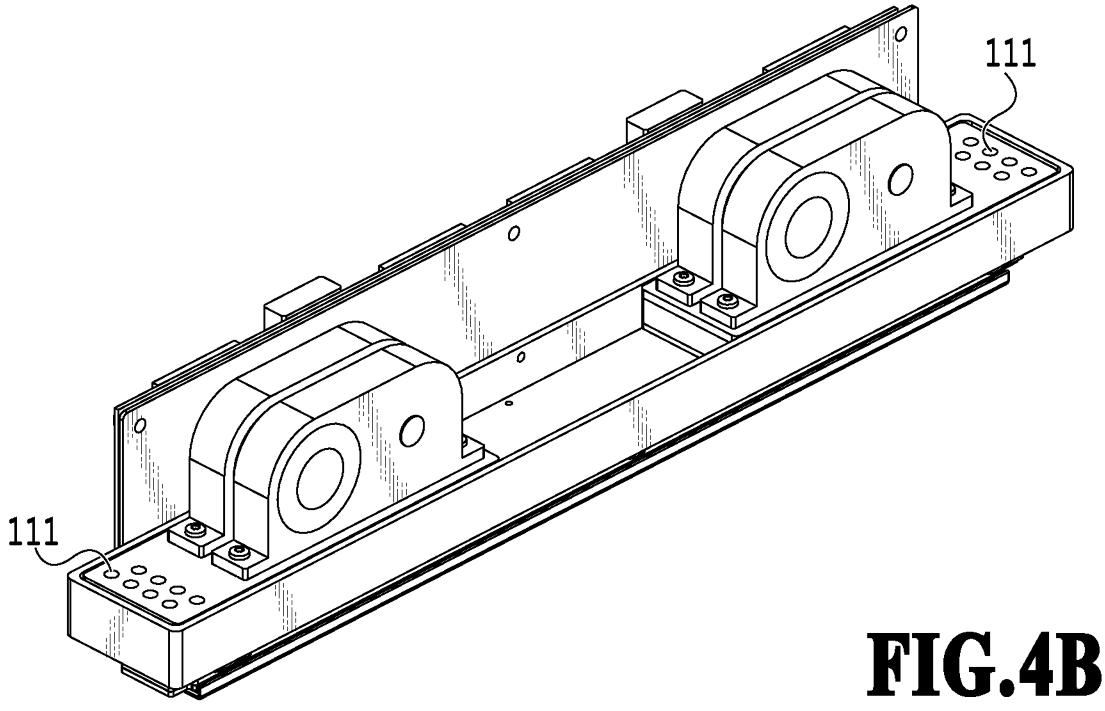

A configuration of the liquid ejection head 3 according to the first embodiment is described. FIGS. 4A and 4B are perspective views of the liquid ejection head 3 according to the present embodiment. The liquid ejection head 3 is a line type liquid ejection head in which 15 recording element boards 10 each capable of ejecting the inks of four colors of C, M, Y, and K are aligned in a straight line (arranged in line). As illustrated in FIG. 4A, the liquid ejection head 3 includes signal input terminals 91 and electric power supply terminals 92 electrically connected to the recording element boards 10 via flexible wiring boards 40 and an electric wiring board 90. The signal input terminals 91 and the electric power supply terminals 92 are electrically connected to a control unit of the recording apparatus 1000, ejection drive signals are supplied to the recording element boards 10 via the signal input terminals 91, and electric power necessary for the ejection is supplied to the recording element boards 10 via the electric power supply terminals 92.

Gathering wires in one place by using an electric circuit in the electric wiring board 90 can make the number of the signal input terminals 91 and the electric power supply terminals 92 smaller than the number of recording element boards 10. The number of electric connecting portions that need to be attached in attachment of the liquid ejection head 3 to the recording apparatus 1000 or removed in replacement of the liquid ejection head can be thereby reduced. As illustrated in FIG. 4B, the liquid connecting portions 111 provided in both end portions of the liquid ejection head 3 are connected to a liquid supply system of the recording apparatus 1000. The inks of four colors of CMYK are thereby supplied from the supply system of the recording apparatus 1000 to the liquid ejection head 3 and the inks having passed an interior of the liquid ejection head 3 are collected into the supply system of the recording apparatus 1000. The inks of the respective colors can be thus circulated via the paths of the recording apparatus 1000 and the paths of the liquid ejection head 3.

Figure 5:
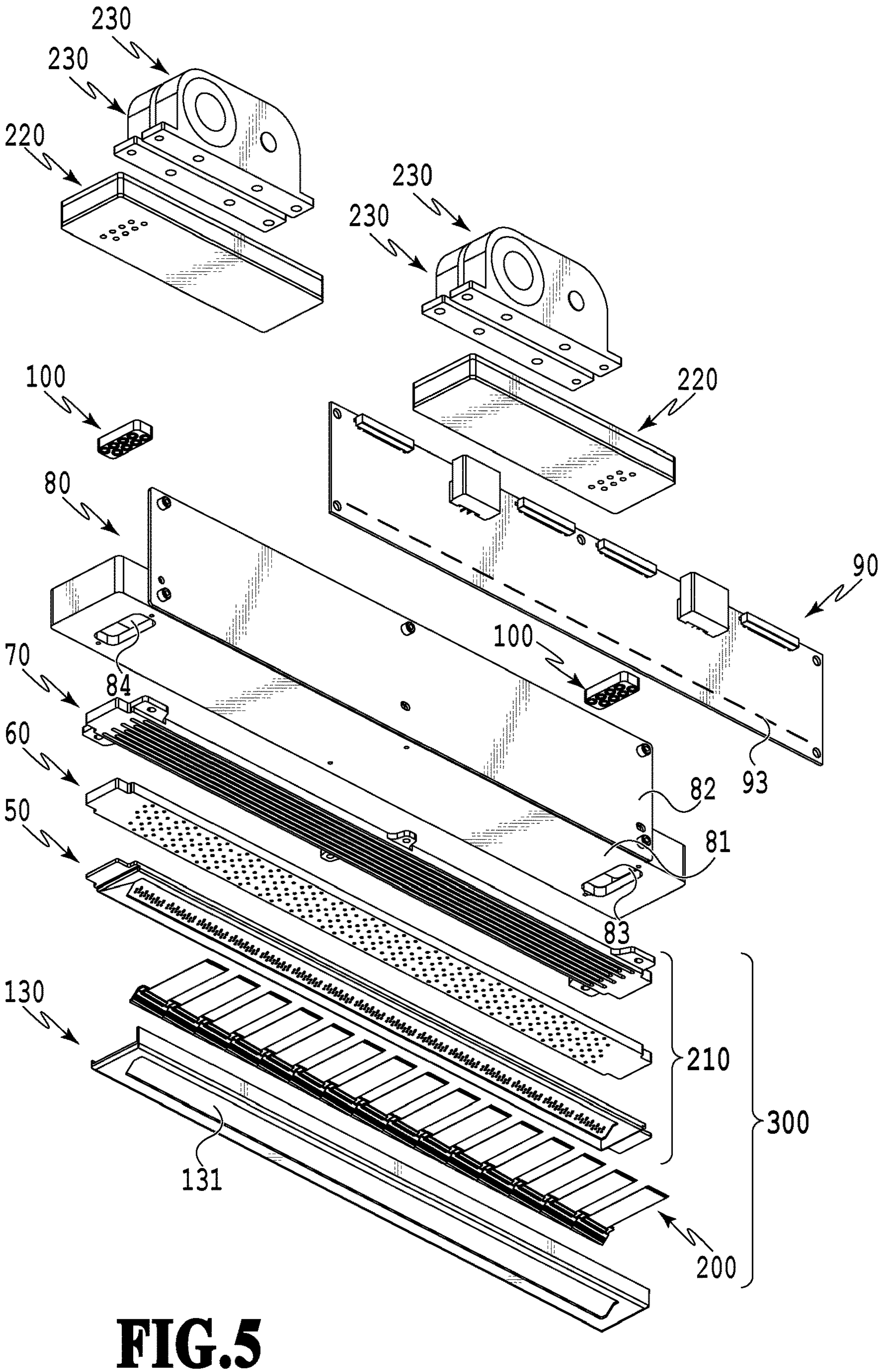
FIG. 5 is an exploded perspective view of the liquid ejection head.

FIG. 5 illustrates an exploded perspective view of parts or units forming the liquid ejection head 3. The liquid ejection unit 300, the liquid supply units 220, and the electric wiring board 90 are attached to a case 80. The liquid supply units 220 are provided with the liquid connecting portions 111 (FIGS. 2 and 3) and filters 221 (FIGS. 2 and 3) for the respective colors that communicate with openings of the liquid connecting portions 111 are provided in the liquid supply units 220 to remove foreign objects in the supplied inks. The two liquid supply units 220 are each provided with the filters 221 respectively for two colors. The inks having passed the filters 221 are supplied to the negative pressure control units 230 corresponding to the respective colors and arranged on the liquid supply units 220.

The negative pressure control units 230 are units including pressure adjustment valves for the respective colors. Each of the negative pressure control units 230 greatly attenuates a pressure droplet change in the supply system (supply system upstream of the liquid ejection head 3) of the recording apparatus 1000 that occurs with fluctuation in the ink flow rate, by means of actions of valves, spring members, and the like provided in the negative pressure control unit 230. Accordingly, the negative pressure control units 230 can stabilize the negative pressure change downstream (on the liquid ejection unit 300 side) of the negative pressure control unit within a certain range. Two pressure adjustment valves for each color are incorporated in the negative pressure control unit 230 of each color as illustrated in FIG. 2. Different control pressures are set for the respective pressure adjustment valves and the valve on the high pressure side and the valve on the low pressure side communicate with the common supply flow passage 211 and the common collection flow passage 212, respectively, in the liquid ejection unit 300 via the liquid supply unit 220.

The case 80 is formed of a liquid ejection unit supporting portion 81 and an electric wiring board supporting portion 82, supports the liquid ejection unit 300 and the electric wiring board 90, and secures the stiffness of the liquid ejection head 3. The electric wiring board supporting portion 82 is a portion for supporting the electric wiring board 90 and is fixed to the liquid ejection unit supporting portion 81 with screws. The liquid ejection unit supporting portion 81 has a role of correcting warping and deforming of the liquid ejection unit 300 and securing positional accuracy of the multiple recording element boards 10 relative to one another, and thereby suppresses stripes and unevenness in a recorded product. Accordingly, the liquid ejection unit supporting portion 81 preferably has sufficient stiffness and the material thereof is preferably a metal material such as SUS or aluminum or a ceramic such as alumina. Openings 83 and 84 in which joint rubbers 100 are inserted are provided in the liquid ejection unit supporting portion 81. The inks supplied from the liquid supply units 220 are guided to a third flow passage member 70 forming the liquid ejection unit 300 via the joint rubbers.

The liquid ejection unit 300 includes multiple ejection modules 200 and a flow passage member 210, and a cover member 130 is attached to a surface of the liquid ejection unit 300 on the recording medium side. In this example, as illustrated in FIG. 5, the cover member 130 is a member having a frame shaped surface provided with a long opening 131, and the recording element boards 10 and sealing members 110 (FIG. 9A) included in the ejection modules 200 are exposed through the opening 131. A frame portion in a periphery of the opening 131 has a function of a contact surface with a cap member that caps the liquid ejection head 3 in the recording standby period. Accordingly, it is preferable to apply adhesive, a sealing material, a filler, or the like along the periphery of the opening 131 and fill unevenness and gaps on an ejection port surface of the liquid ejection unit 300 to form a closed space in a capped state.

Next, a configuration of the flow passage member 210 included in the liquid ejection unit 300 is described. As illustrated in FIG. 5, the flow passage member 210 is a member in which a first flow passage member 50, a second flow passage member 60, and the third flow passage member 70 are stacked one on top of another. The flow passage member 210 distributes the inks supplied from the liquid supply units 220 to the ejection modules 200 and returns the ink flowing back from the ejection modules 200 to the liquid supply units 220. The flow passage member 210 is fixed to the liquid ejection unit supporting portion 81 with screws and this suppresses warping and deforming of the flow passage member 210.

Figure 6:
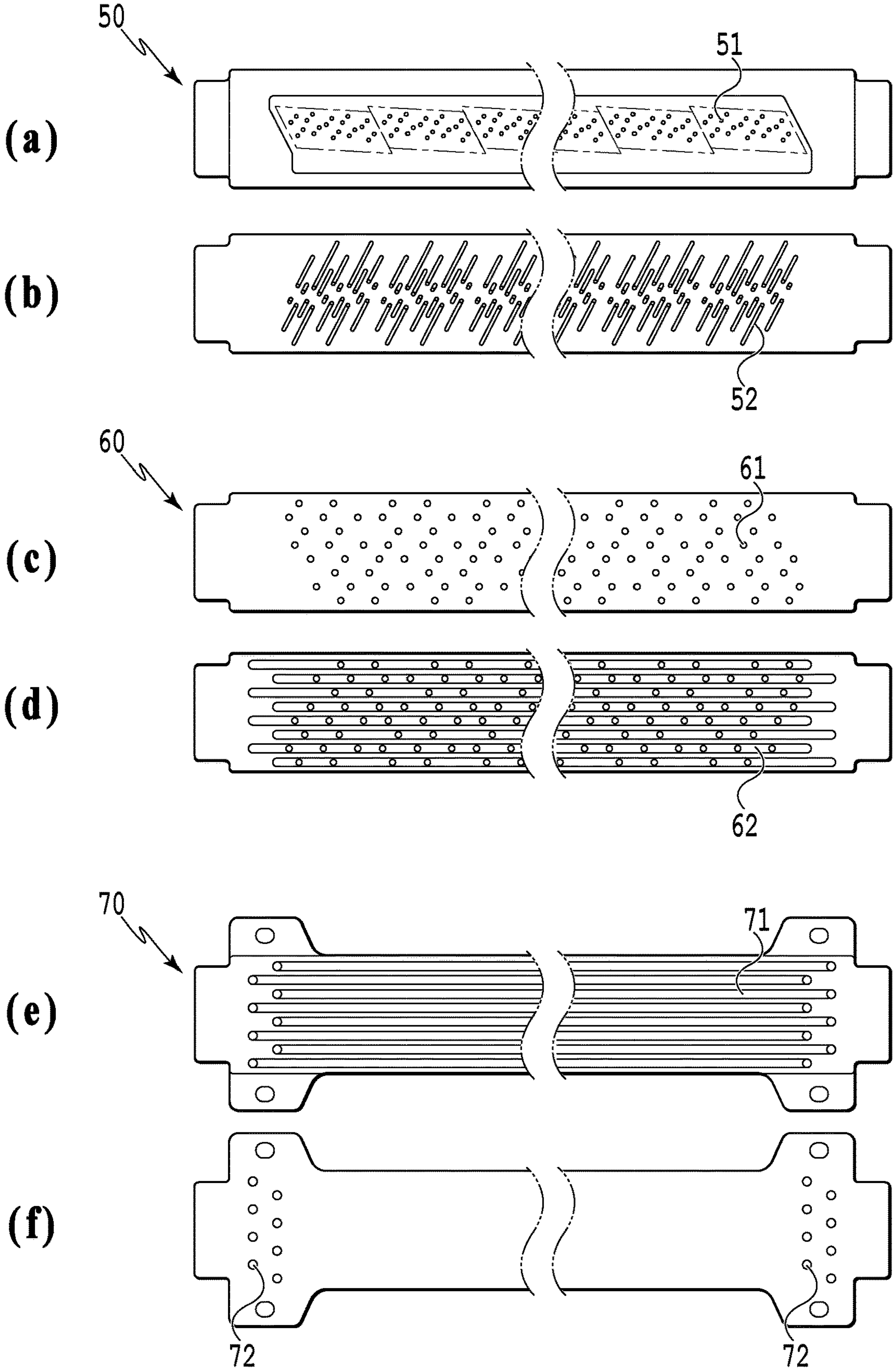
FIG. 6 is a view illustrating flow passage members.
Figure 7:
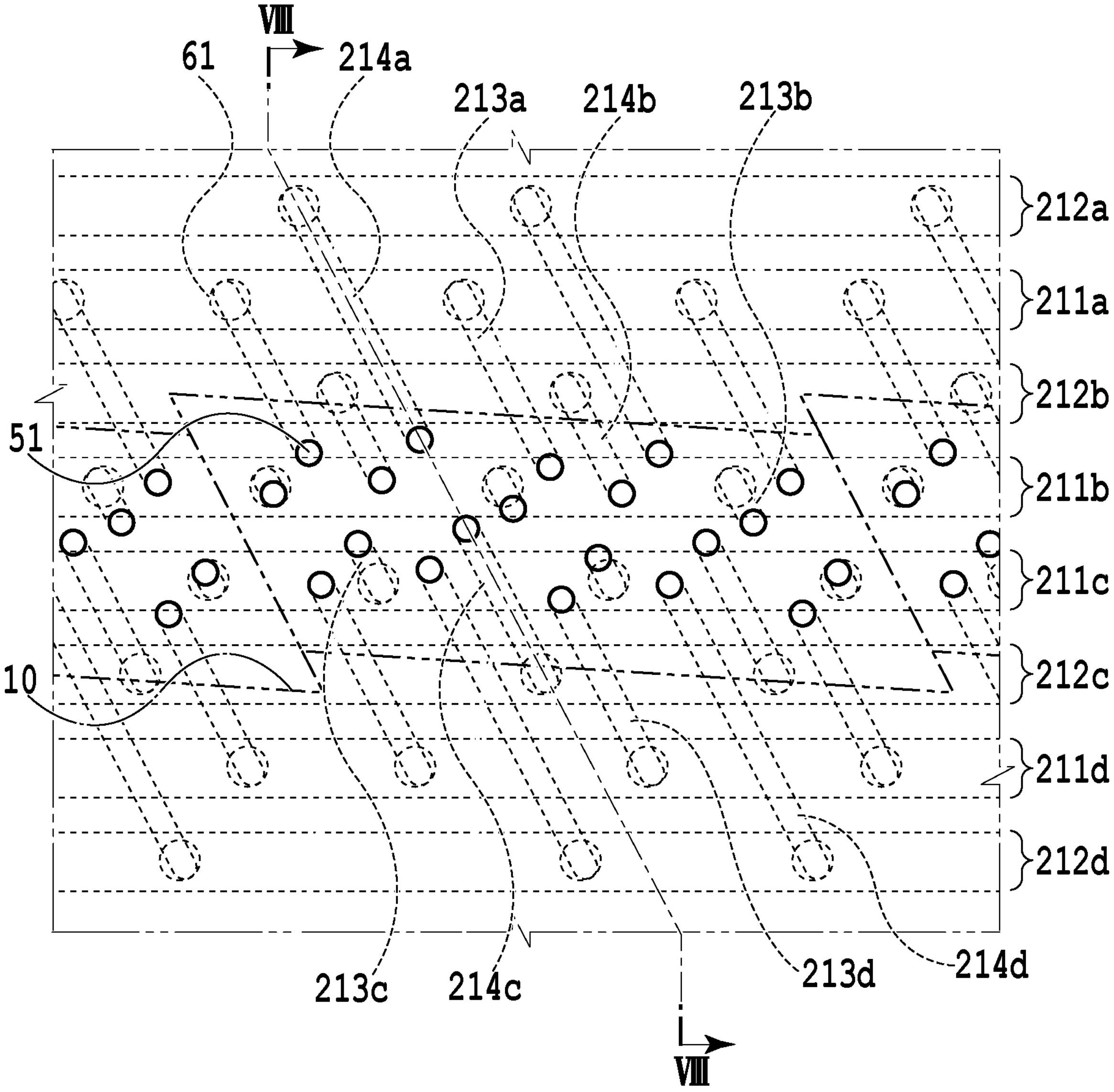
FIG. 7 is a view illustrating connection relationships of flow passages in the flow passage members.

Reference signs (a) to (f) FIG. 6 are views illustrating front faces and back faces of the first to third flow passage members. Reference sign (a) in FIG. 6 denotes a face of the first flow passage member 50 on the side where the ejection modules 200 are mounted and Reference sign (f) in FIG. 6 denotes a face of the third flow passage member 70 on the side in contact with the liquid ejection unit supporting portion 81. The first flow passage member 50 and the second flow passage member 60 are joined to each other such that the face denoted reference sign (b) in FIG. 6 and the face denoted by reference sign (c) in FIG. 6 which are contact surfaces of the respective flow passage members face each other. The second flow passage member and the third flow passage member are joined to each other such that the face denoted reference sign (d) in FIG. 6 and the face denoted reference sign (e) in FIG. 6 which are contact surfaces of the respective flow passage members face each other. Joining the second flow passage member 60 and the third flow passage member 70 causes a group of common flow passage grooves 62 and a group of common flow passage grooves 71 formed in the respective flow passage members to form eight common flow passages extending in the longitudinal direction of the flow passage members. As illustrated in FIG. 7, a set of the common supply flow passage 211 and the common collection flow passage 212 are formed for each color in the flow passage member 210. Communication ports 72 of the third flow passage member 70 communicate with the respective holes of the joint rubbers 100 and fluidly communicate with the liquid supply units 220. Multiple communication ports 61 are formed on bottom surfaces of the common flow passage grooves 62 of the second flow passage member 60 and communicate with one end portions of individual flow passage grooves 52 of the first flow passage member 50. Communication ports 51 are formed in the other end portions of the individual flow passage grooves 52 of the first flow passage member 50 and the individual flow passage grooves 52 fluidly communicate with the multiple ejection modules 200 via the communication ports 51. The individual flow passage grooves 52 allow the flow passages to be gathered on the center side of the flow passage member.

The first to third flow passage members are preferably made of a material that is corrosion resistant to liquid and that has a low coefficient of linear thermal expansion. For example, a composite material (resin material) that uses alumina, liquid crystal polymer (LCP), polyphenylenesulfide (PPS), or polysulfone (PSF) as a base material and to which an inorganic filler such as silica fine particles and fibers are added can be preferably used as the material. As a method of forming the flow passage member 210, the three flow passage members may be stacked and bonded to one another. Moreover, in the case where a composite resin material is selected as the material, a bonding method by welding may be employed.

Next, connection relationships of the flow passages in the flow passage member 210 are described by using FIG. 7. FIG. 7 is a transparent view in which the flow passages in the flow passage member 210 formed by joining the first to third flow passage members are partially viewed in an enlarged manner from the side of the face of the first flow passage member 50 on which the ejection modules 200 are mounted. The flow passage member 210 is provided with the common supply flow passages 211 (211*a*, 211*b*, 211*c*, and 211*d*) for the respective colors and the common collection flow passages 212 (212*a*, 212*b*, 212*c*, and 212*d*) for the respective colors that extend in the longitudinal direction of the liquid ejection head 3. Multiple individual supply flow passages (213*a*, 213*b*, 213*c*, or 213*d*) formed by the individual flow passage grooves 52 are connected to the common supply flow passage 211 for each color via the communication ports 61. Multiple individual collection flow passages (214*a*, 214*b*, 214*c*, or 214*d*) formed by the individual flow passage grooves 52 are connected to the common collection flow passage 212 for each color via the communication ports 61. Such a flow passage configuration allows the inks to be gathered from the common supply flow passages 211 to the recording element boards 10 located in a center portion of the flow passage members via the individual supply flow passages 213. Moreover, the ink can be collected from the recording element boards 10 into the common collection flow passages 212 via the individual collection flow passages 214.

Figure 8:
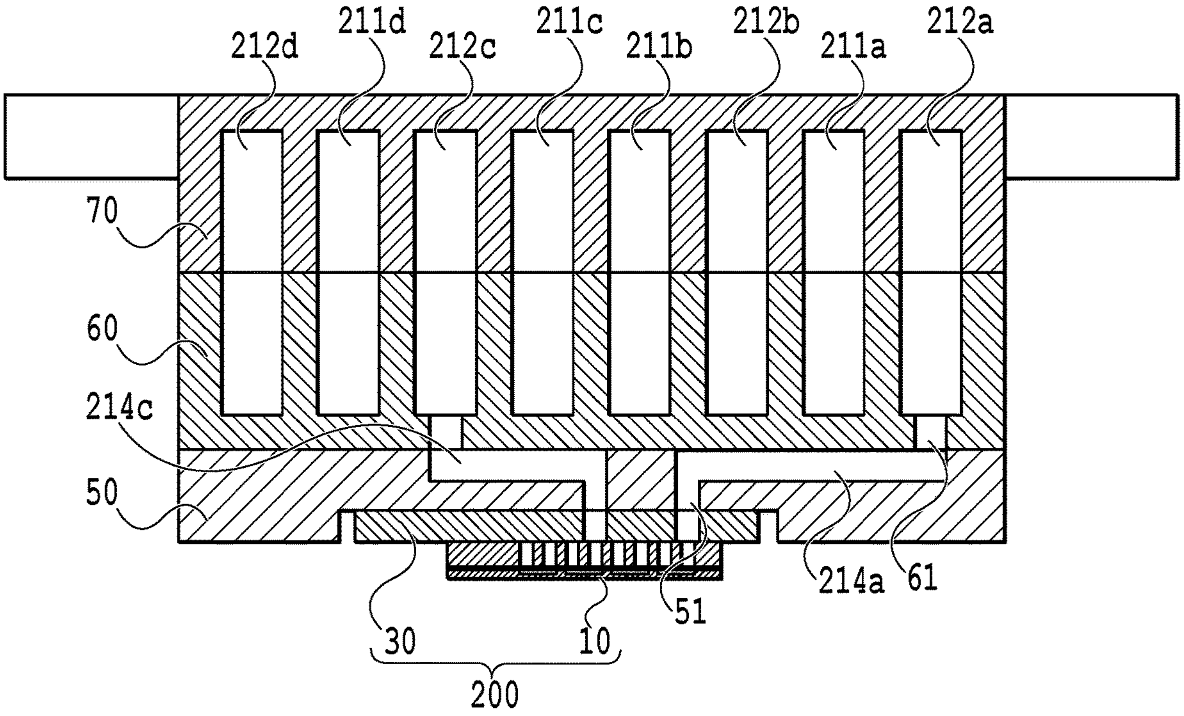
FIG. 8 is a cross-sectional view along the cross-sectional line VIII-VIII in FIG. 7.

FIG. 8 is a view illustrating a cross section along the VIII-VIII line in FIG. 7. As illustrated in FIG. 8, each of the individual collection flow passages (214*a* and 214*c*) communicates with the ejection module 200 via the communication port 51. Although only the individual collection flow passages (214*a* and 214*c*) are illustrated in FIG. 8, as illustrated in FIG. 7, the individual supply flow passages 213 communicate with the ejection module 200 in another cross section. In a support member 30 and the recording element board 10 included in each ejection module 200, flow passages for supplying the inks from the first flow passage member 50 to recording elements 15 (FIGS. 10A to 10C) provided in the recording element board 10 are formed. Moreover, in the support member 30 and the recording element board 10, flow passages for partially or entirely collecting (flowing-back) the inks supplied to the recording elements 15 into the first flow passage member 50 are formed. In this example, the common supply flow passage 211 for each color is connected to the negative pressure control unit 230 (high pressure side) for the corresponding color via the liquid supply unit 220 and the common collection flow passage 212 is connected to the negative pressure control unit 230 (low pressure side) via the liquid supply unit 220. The negative pressure control unit 230 generates a differential pressure (pressure difference) between the common supply flow passage 211 and the common collection flow passage 212. Accordingly, in the liquid ejection head of the present embodiment in which the flow passages are connected as illustrated in FIGS. 7 and 8, a flow from the common supply flow passage 211 to the individual supply flow passages 213, to the recording element boards 10, to the individual collection flow passages 214, and to the common collection flow passage 212 is generated for each color.

<Ejection Module>

Figure 9A:
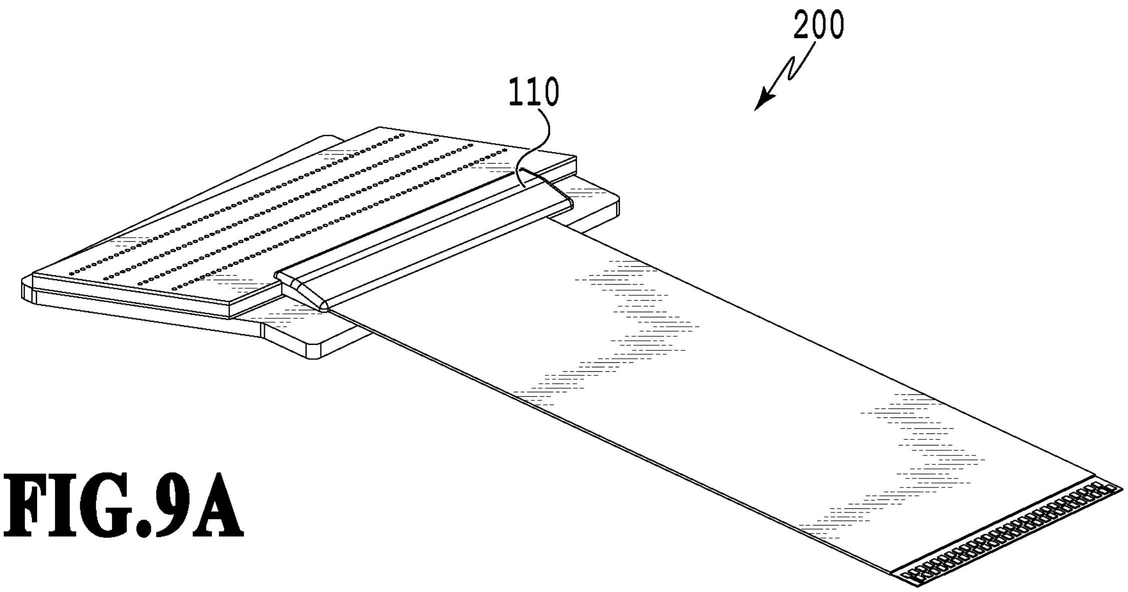
FIGS. 9A and 9B are views illustrating an ejection module.
Figure 9B:
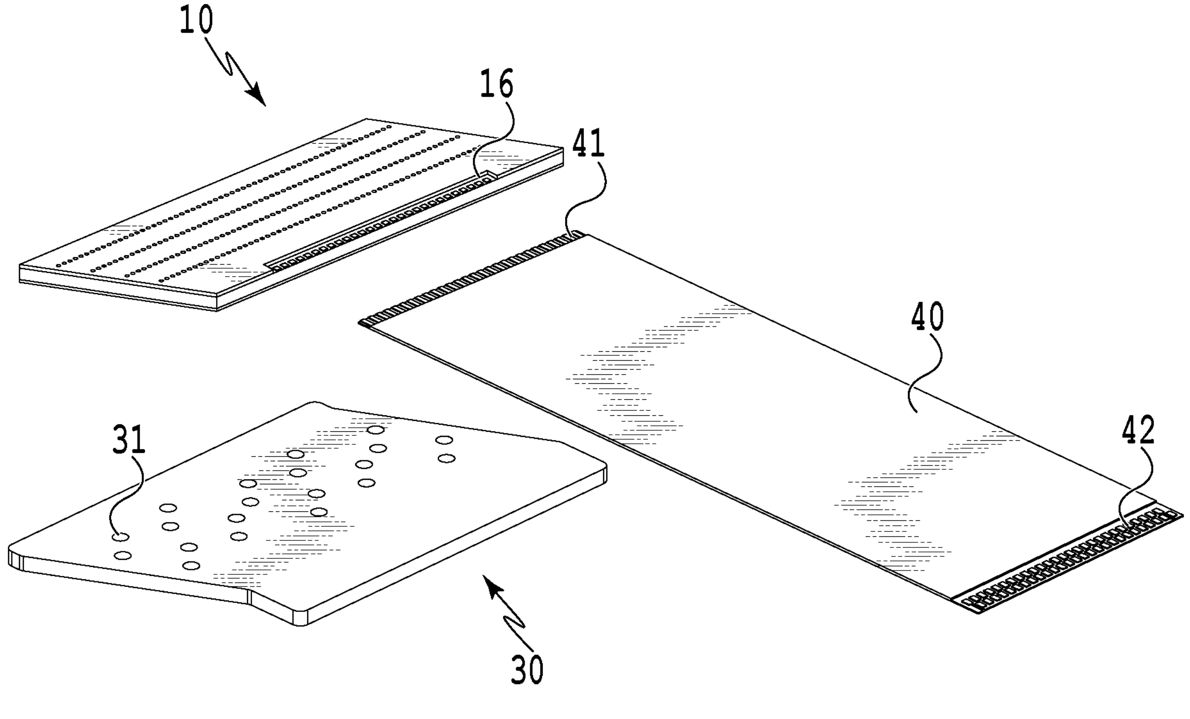

FIG. 9A illustrates a perspective view of one ejection module 200 and FIG. 9B illustrates an exploded view of this ejection module 200. As a method of manufacturing the ejection module 200, first, the recording element board 10 and the flexible wiring board 40 are bonded onto the support member 30 provided with liquid communication ports 31 in advance. Thereafter, a terminal 16 on the recording element board 10 and a terminal 41 on the flexible wiring board 40 are electrically connected to each other by wire bonding and then a wire-bonded portion (electric connecting portion) is covered with the sealing member 110 to be sealed. A terminal 42 of the flexible wiring boards 40 on the opposite side to the recording element board 10 is electrically connected to a connection terminal 93 (see FIG. 5) of the electric wiring board 90. Since the support member 30 is a support body that supports the recording element board 10 and is also a flow passage member that causes the recording element board 10 and the flow passage member 210 to fluidly communicate with each other, a member that has high flatness and that can be joined to the recording element board with sufficiently high reliability is preferable as the support member 30. The material of the support member 30 is preferably, for example, alumina or a resin material.

<Structure of Recording Element Board>

Figure 10A:
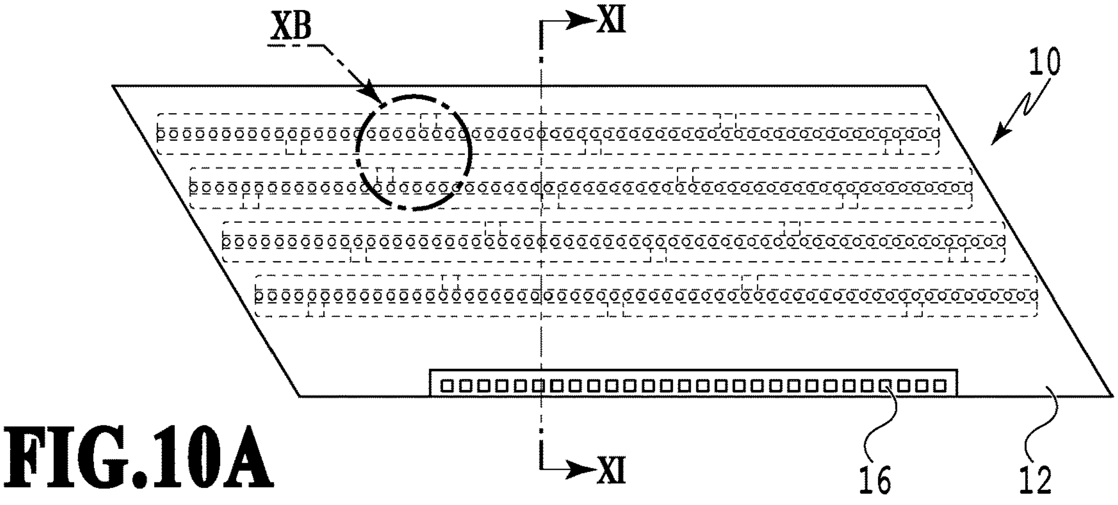
FIGS. 10A to 10C are views illustrating a structure of a recording element board.
Figure 10B:
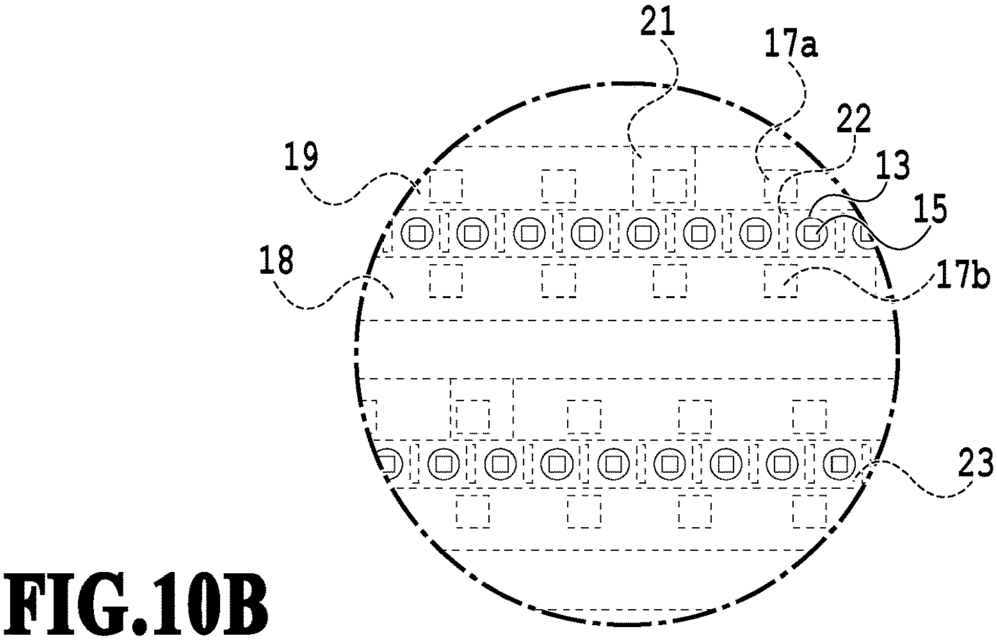
Figure 10C:
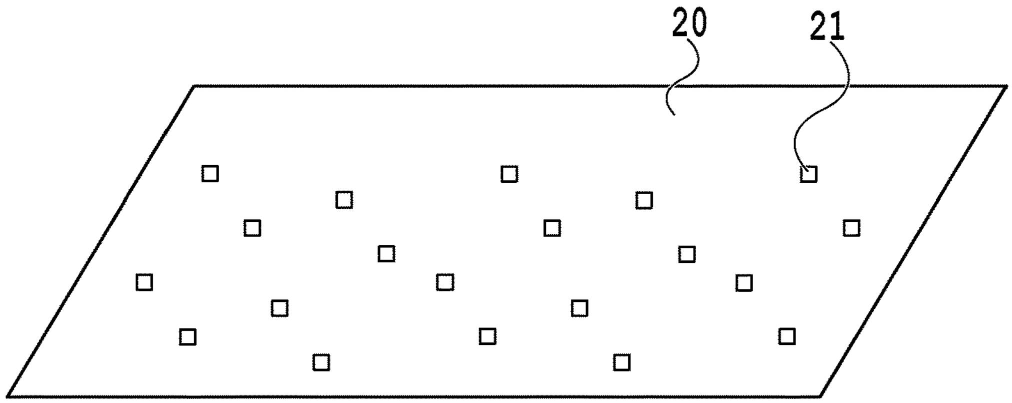
Figure 11:
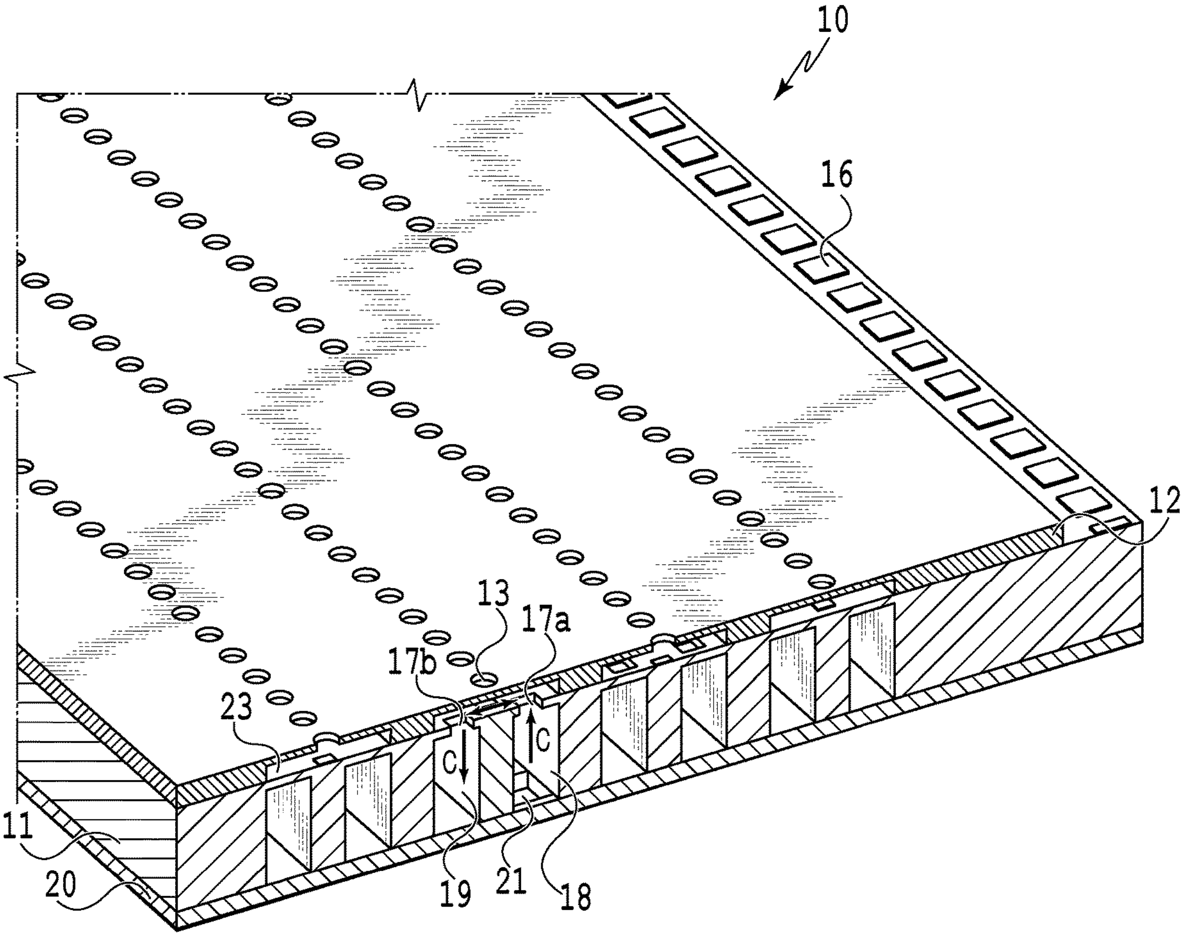
FIG. 11 is a perspective view illustrating structures of the recording element board and a lid member along the cross-sectional line XI-XI in FIG. 10A.

A configuration of the recording element board 10 in the present embodiment is described. FIG. 10A illustrates a plan view of a face of the recording element board 10 on the side where ejection ports 13 are formed, FIG. 10B illustrates an enlarged view of a portion denoted by XB in FIG. 10A, and FIG. 10C illustrates a plan view of the back side of FIG. 10A. FIG. 11 is a perspective view illustrating cross sections of the recording element board 10 and a lid member 20 along the cross-sectional line XI-XI illustrated in FIG. 10A. As illustrated in FIG. 10A, four ejection port rows corresponding to the respective ink colors are formed in an ejection port forming member 12 of the recording element board 10. Note that an extending direction of the ejection port rows in which the multiple ejection ports 13 are aligned is hereinafter referred to as "ejection port row direction".

As illustrated in FIG. 10B, the recording elements 15 that are heating elements configured to generate bubbles in the inks by means of thermal energy are arranged at positions corresponding to the respective ejection ports 13. Pressure chambers 23 including the recording elements 15 therein are sectioned by partitions 22. The recording elements 15 are electrically connected to the terminal 16 in FIG. 10A by electrical wiring (not illustrated) provided in the recording element board 10. The recording elements 15 generate heat and cause the inks to boil based on pulse signals received from a control circuit of the recording apparatus 1000 via the electric wiring board 90 (FIG. 5) and the flexible wiring board 40 (FIG. 9B). Force of bubbles generated by this boiling ejects the inks from the ejection ports 13. As illustrated in FIG. 10B, a liquid supply passage 18 extends along each ejection port row on one side thereof and a liquid collection passage 19 extends along the ejection port row on the other side thereof. The liquid supply passage 18 and the liquid collection passage 19 are flow passages provided in the recording element board 10 and extending in the ejection port row direction and communicate with each ejection port 13 via a supply port 17*a* and a collection port 17*b*, respectively.

As illustrated in FIGS. 10C and 11, the sheet-shaped lid member 20 is stacked on the back side of the face of the recording element board 10 on which the ejection ports 13 are formed, and multiple openings 21 that are described later and that communicate with the liquid supply passage 18 and the liquid collection passage 19 are provided in the lid member 20. In the present embodiment, three openings 21 are provided for one liquid supply passage 18 and two openings 21 are provided for one liquid collection passage 19 in the lid member 20. As illustrated in FIG. 10B, the openings 21 in the lid member 20 communicate with the multiple communication ports 51 illustrated in FIG. 7 and the like, respectively. As illustrated in FIG. 11, the lid member 20 has a function of a lid that forms part of walls of the liquid supply passage 18 and the liquid collection passage 19 formed in a substrate 11 of the recording element board 10. The lid member 20 is preferably an object that has sufficient corrosion resistance to the inks, and high accuracy is required for the opening shape and opening positions of the openings 21 from the viewpoint of preventing color mixing. Accordingly, it is preferable that a photosensitive resin material and a silicon plate are used as the material of the lid member 20 and the openings 21 are provided by a photolithography process. As described above, the lid member is a member that converts the pitch of the flow passages by using the openings 21, desirably has a small thickness considering pressure droplet, and is desirably formed of a film-shaped member.

Next, flow of the inks in the recording element board 10 is described. FIG. 11 is a perspective view illustrating the cross sections of the recording element board 10 and the lid member 20 along the cross-sectional line XI-XI in FIG. 10A. In the recording element board 10, the substrate 11 made of Si and the ejection port forming member 12 made of a photosensitive resin are stacked one on top of the other and the lid member 20 is joined to the back face of the substrate 11. The recording elements 15 are formed on one face of the substrate 11 (FIG. 10B) and grooves forming the liquid supply passage 18 and the liquid collection passage 19 extending along each ejection port row are formed on the back face of the substrate 11. The liquid supply passage 18 and the liquid collection passage 19 formed by the substrate 11 and the lid member 20 are connected respectively to the common supply flow passage 211 and the common collection flow passage 212 in the flow passage member 210 and a differential pressure is generated between the liquid supply passage 18 and the liquid collection passage 19. In the ejection ports that are not performing the ejection operation while the ink is ejected from the multiple ejection ports 13 of the liquid ejection head 3 to perform recording, flow of the ink in the liquid supply passage 18 provided in the substrate 11 is flow illustrated by the arrows C in FIG. 11 due to this differential pressure. Specifically, the ink flows to the liquid collection passage 19 via the supply port 17*a*, the pressure chamber 23, and the collection port 17*b*. This flow allows bubbles, foreign objects, viscosity-increased ink generated by evaporation from the ejection ports 13, and the like to be collected into the liquid collection passage 19, in the ejection ports 13 and the pressure chambers 23 in which recording is paused. Moreover, it is possible to suppress an increase in the viscosity of the ink in the ejection ports 13 and the pressure chambers 23. The ink collected into the liquid collection passage 19 passes through the openings 21 of the lid member 20 and the liquid communication ports 31 (see FIG. 9B) of the support member 30 and is collected into the communication ports 51 in the flow passage member 210, the individual collection flow passages 214, and the common collection flow passage 212 in this order. The ink is eventually collected into a supply path of the recording apparatus 1000.

Specifically, the ink supplied from the recording apparatus main body to the liquid ejection head 3 flows in the following order to be supplied and collected. The ink first flows into an interior of the liquid ejection head 3 from the liquid connecting portion 111 of the liquid supply unit 220. Then, the ink is supplied to the joint rubber 100, to the communication port 72 and the common flow passage groove 71 provided in the third flow passage member, to the common flow passage groove 62 and the communication port 61 provided in the second flow passage member, and to the individual flow passage groove 52 and the communication port 51 provided in the first flow passage member in this order. Then, the ink is supplied to each pressure chamber 23 via the liquid communication port 31 provided in the support member 30, the opening 21 provided in the lid member, the liquid supply passage 18 provided in the substrate 11, and the supply port 17*a* in this order. The ink supplied to the pressure chamber 23 and not ejected from the ejection port 13 flows through the collection port 17*b* and the liquid collection passage 19 provided in the substrate 11, the opening 21 provided in the lid member, and the liquid communication port 31 provided in the support member 30 in this order. Then, the ink flows through the communication port 51 and the individual flow passage groove 52 provided in the first flow passage member, the communication port 61 and the common flow passage groove 62 provided in the second flow passage member, the common flow passage groove 71 and the communication port 72 provided in the third flow passage member 70, and the joint rubber 100 in this order. Furthermore, the ink flows to the outside of the liquid ejection head 3 from the liquid connecting portion 111 provided in the liquid supply unit. In the mode of the first circulation path illustrated in FIG. 2, the ink flowing in from the liquid connecting portion 111 passes the negative pressure control unit 230 and is then supplied to the joint rubber 100. In the mode of the second circulation path illustrated in FIG. 3, the ink collected from the pressure chamber 23 passes the joint rubber 100, then passes the negative pressure control unit 230, and flows to the outside the liquid ejection head from the liquid connecting portion 111.

Moreover, as illustrated in FIGS. 2 and 3, not all of the ink flowing in from the one end of the common supply flow passage 211 of the liquid ejection unit 300 is supplied to the pressure chambers 23 via the individual supply flow passages 213*a*. There is a portion of the ink that flows from the other end of the common supply flow passage 211 to the liquid supply unit 220 without flowing into the individual supply flow passages 213*a*. Providing a path through which the ink flows without passing the recording element boards 10 as described above can suppress backward-flow of the ink circulation flow even in the case where the recording element boards 10 including fine flow passages with large flow resistance are provided as in the present embodiment. As described above, since the liquid ejection head of the present embodiment can suppress an increase in the viscosity of the ink in portions near the pressure chambers and the ejection ports, it is possible to suppress non-ejection and deviation of an ejection direction from a normal direction and, as a result, perform high-quality recording.

<Positional Relationships Between Recording Element Boards>

Figure 12:
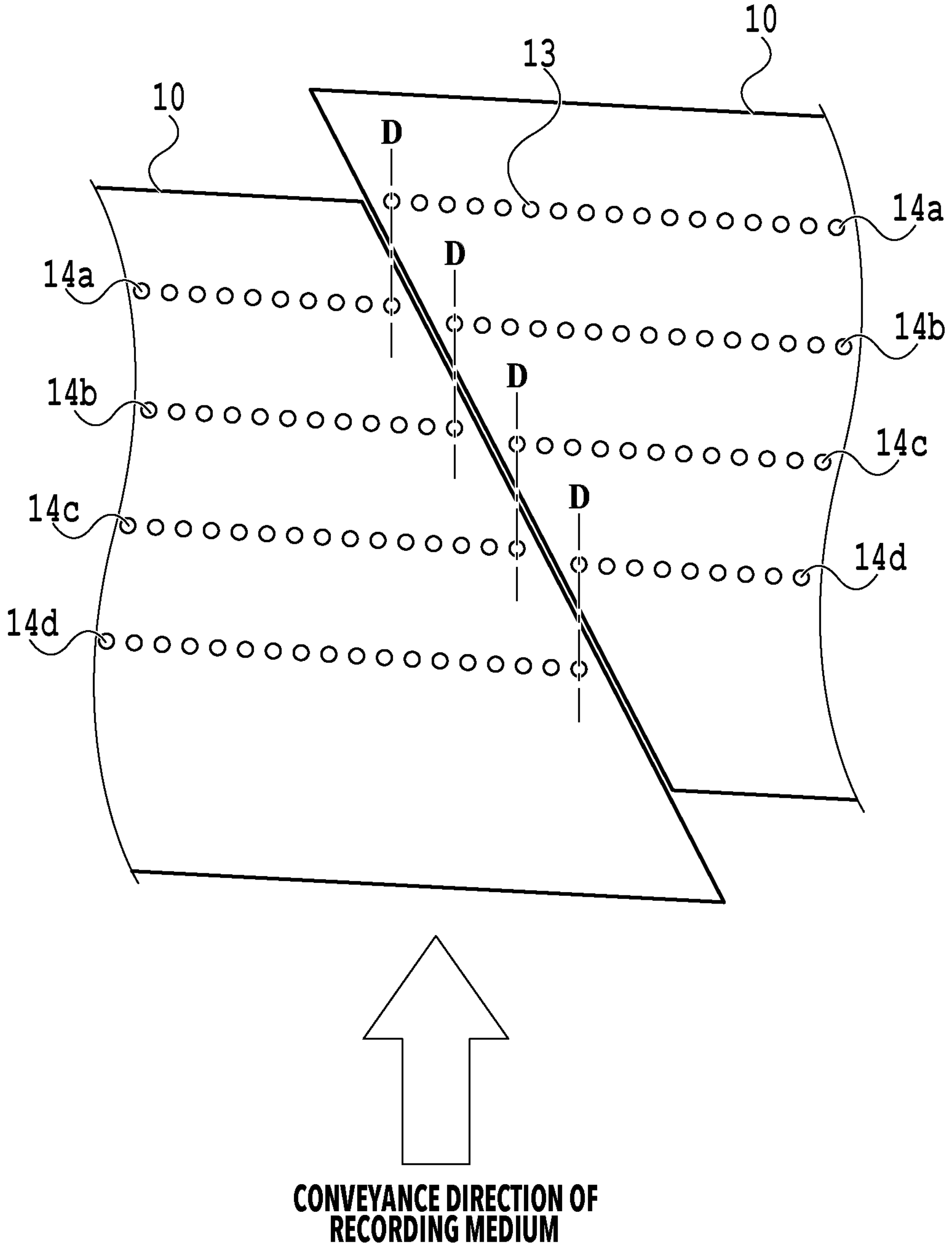
FIG. 12 is a plan view illustrating adjacent portions of the recording element boards in a partially enlarged manner.

FIG. 12 is a plan view illustrating adjacent portions of the recording element boards in two adjacent ejection modules in a partially enlarged manner. As illustrated in FIG. 10A and the like, in the present embodiment, recording element boards with a substantially parallelogram shape are used in the present embodiment. As illustrated in FIG. 12, in each recording element board 10, the ejection port rows (14*a* to 14*d*) in which the ejection ports 13 are aligned are arranged to be tilted at a certain angle with respect to the conveyance direction of the recording medium. In the ejection port rows in the adjacent portions of the respective recording element boards 10, at least two ejection ports thereby overlap each other in the conveyance direction of the recording medium. In FIG. 12, two ejection ports on each of D lines are in an overlapping relationship. Even in the case where the position of the recording element board 10 is misaligned from a predetermined position by a certain degree, this arrangement can make black stripes and blank areas in a recorded image less noticeable by performing drive control of the overlapping ejection ports. The configuration as in FIG. 12 can be achieved also in the case where the multiple recording element boards 10 are arranged on a straight line (in line) instead of a zigzag pattern. This can provide measures against black stripes and blank areas in overlap portions of the recording element boards 10 while suppressing an increase in the length of the liquid ejection head in the conveyance direction of the recording medium. Although the main flat surface of each recording element board has the parallelogram shape in this example, the present embodiment is not limited to this and the configuration of the present embodiment can be preferably applied also to the case where a recording element board with, for example, a rectangular shape, a trapezoidal shape, or any other shape is used.

<Structure of Heat Applying Portion in Recording Element Board>

Figure 13A:
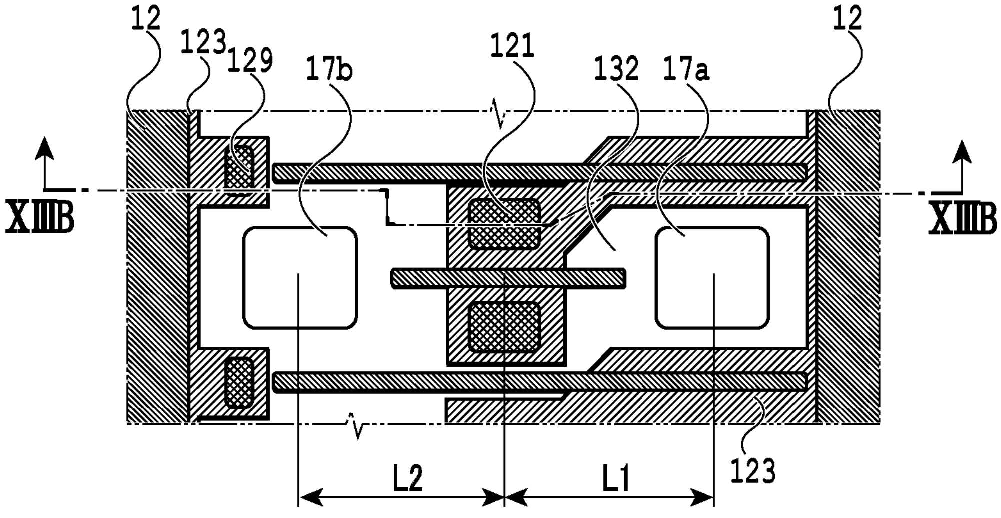
FIGS. 13A and 13B are views illustrating a structure of a heat applying portion in the recording element board.
Figure 13B:
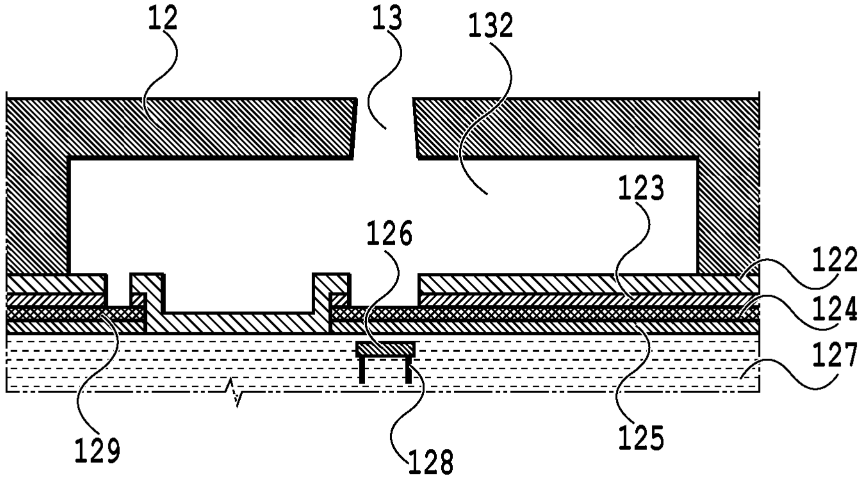

A structure of a heat applying portion in the recording element board according to the present embodiment is described below by using FIGS. 13A and 13B. FIG. 13A is a plan view schematically illustrating a region around the heat applying portion in the recording element board 10 in an enlarged manner. Moreover, FIG. 13B is a cross-sectional view along the one-dot chain line XIIIB-XIIIB in FIG. 13A.

In the liquid ejection head, the recording element board for ejecting the liquid is formed by stacking multiple layers one on top of another on a substrate 121 made of silicon. In the present embodiment, a heat accumulating layer made of a thermally oxidized film, an SiO film, a SiN film, or the like is arranged on the substrate 121. Moreover, a heating resistive element 126 is arranged on the heat accumulating layer and an electrode wiring layer (not illustrated) serving as wiring made of a metal material such as Al, Al—Si, Al—Cu, or the like is connected to the heating resistive element 126 via a tungsten plug 128. As illustrated in FIG. 13B, an insulating protection layer 127 (first protection layer) is arranged on the heating resistive element 126. The insulating protection layer 127 is an insulating layer provided above the heating resistive element 126 to cover the heating resistive element 126. The insulating protection layer 127 is made of a SiO film, a SiN film, or the like.

A protection layer for blocking contact with liquid is arranged on the insulating protection layer 127. The protection layer includes a lower protection layer 125, an upper protection layer 124 (second protection layer), and an adhering protection layer 123 and protects a surface of the heating resistive element 126 from chemical and physical impacts that occur with the heating of the heating resistive element 126.

In the present embodiment, the lower protection layer 125 is made of tantalum (Ta), the upper protection layer 124 is made of iridium (Ir), and the adhering protection layer 123 is made of tantalum (Ta). Moreover, the protection layers made of these materials are electively conductive. A protection layer 122 for improving adhesion to the ejection port forming member 12 and a liquid resistant body is arranged on the adhering protection layer 123. The protection layer 122 is made of SiC. The protection layer 122 is made of SiC. The upper protection layer 124 is made of a material that contains a metal which dissolves by electrochemical reaction and that forms no oxidized film hindering dissolution by being heated.

In the case where the liquid is ejected, an upper portion of the upper protection layer 124 is in contact with the liquid and is in a harsh environment in which bubbles are generated by instantaneous temperature rise of the liquid in the upper portion and disappear in this portion to cause cavitation. Accordingly, in the present embodiment, the upper protection layer 124 made of an iridium material with high corrosion resistance and high reliability is formed and comes into contact with the liquid at a position corresponding to the heating resistive element 126.

The present embodiment employs the ink circulation configuration in which the liquid is supplied into the pressure chamber 23 from the supply port 17*a* and is collected into the collection port 17*b*. Accordingly, on the heating resistive element 126, the liquid flows in a direction from the supply port 17*a* on the upstream side toward the collection port 17*b* on the downstream side during printing.

Moreover, in the present embodiment, a kogation suppression process for suppressing kogation deposited on the upper protection layer 124 on the heating resistive element 126 is performed during the printing. Specifically, a portion of the upper protection layer 124 directly above the heating resistive element 126 is set as one electrode 121 (first electrode) and an opposing electrode 129 (second electrode) corresponding to the electrode 121 is provided to form an electric field through the liquid in a liquid chamber 132. Particles such as pigment charged to a negative potential in the liquid are thereby repelled from the surface of the upper protection layer 124 on the heating resistive element 126. Reducing the presence ratio of the particles such as pigment charged to a negative potential near the surface of the upper protection layer 124 as described above suppresses kogation deposited on the upper protection layer 124 on the heating resistive element 126 during printing. Such kogation suppression is performed in mind of the following fact: kogation is a phenomenon that occurs in the case where a color material, additives, and the like contained in the liquid are heated to high temperature to be decomposed at a molecular level, change to low-solubility substances, and are physically adsorbed onto the upper protection layer. Reducing the presence ratio of the color material, additives, and the like that cause kogation near the surface of the upper protection layer 124 on the heating resistive element 126 in the high-temperature heating of the upper protection layer 124 leads to suppression of kogation.

A mechanism of electric field control (also referred to as potential control and potential difference control) used in the present embodiment is described below by using FIGS. 14A to 14D. In FIG. 14A, the electrode 121 of the upper protection layer and the opposing electrode 129 are arranged in the liquid chamber 132 and the liquid chamber 132 is filled with the liquid. The liquid contains particles 141 such as pigment charged to a negative potential and the particles 141 are substantially evenly dispersed in the liquid.

Figure 14D:
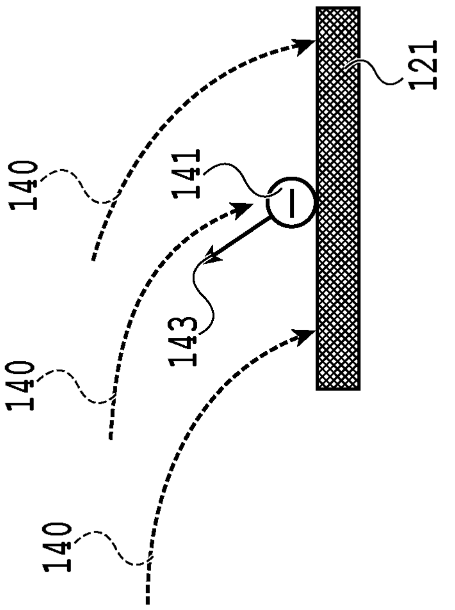
FIGS. 14A to 14D are explanatory views of a kogation suppression process in the case where negatively-charged particles are the main cause of kogation.
Figure 14A:
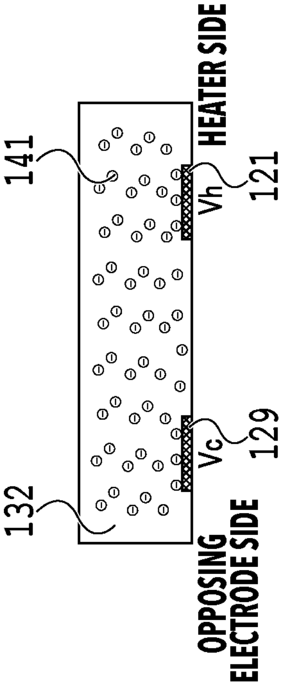
Figure 14B:
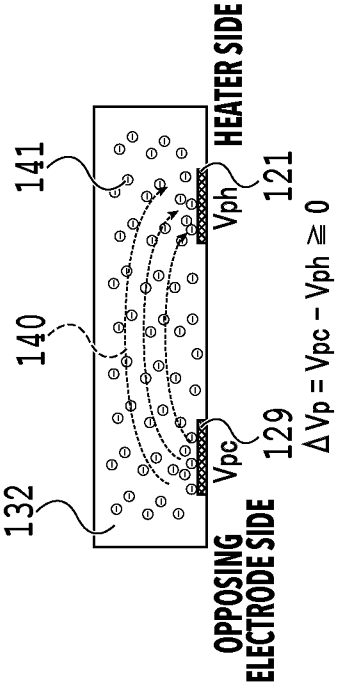

FIG. 14B illustrates a state where voltage application is such that a potential of the electrode 121 in the upper protection layer is lower than that of the opposing electrode 129 and, for example, a potential difference between the electrode 121 and the opposing electrode 129 is about 0.5 to 2.5 V. This is due to the following reason: assume that the upper protection layer 124 is made of iridium; in this configuration, electrochemical reaction between the electrode 121 and the liquid occurs in the case where the potential difference between both electrodes exceeds 2.5 V, and the surface of the electrode 121 dissolves into the liquid; accordingly, the potential level is preferably set to a level at which the electrode 121 does not dissolve. Specifically, in the present embodiment, in the case where the potential difference between the electrode 121 and the opposing electrode 129 in the printing is represented by ΔVp and the potential difference between the electrode 121 and the opposing electrode 129 in the aging is represented by ΔVa, the following formulae are preferably satisfied.

$$|\Delta Va| \leq 2.5 \text{ V} \quad \text{formula (1)}$$

$$|\Delta Vp| \leq 2.5 \text{ V} \quad \text{formula (2)}$$

Specifically, the state in this case is such that, although an electric field 140 is formed between the electrode 121 in the upper protection layer and the opposing electrode 129 through the liquid, no current is flowing therebetween. Since the electrode 121 in the upper protection layer has a negative potential with respect to the opposing electrode 129, the particles 141 charged to the negative potential are repelled from the surface of the electrode 121 in the upper protection layer and the presence ratio of the particles 141 near the surface of the electrode 121 in the upper protection layer decreases.

FIG. 14D is a schematic view in which a portion near the upper protection layer illustrated in FIG. 14B is enlarged. The particles 141 charged to the negative potential receive repulsive force 143 from the surface of the electrode 121 of the upper protection layer 11 along lines of electric force of the electric field 140 formed in the liquid and are repelled.

Figure 17:
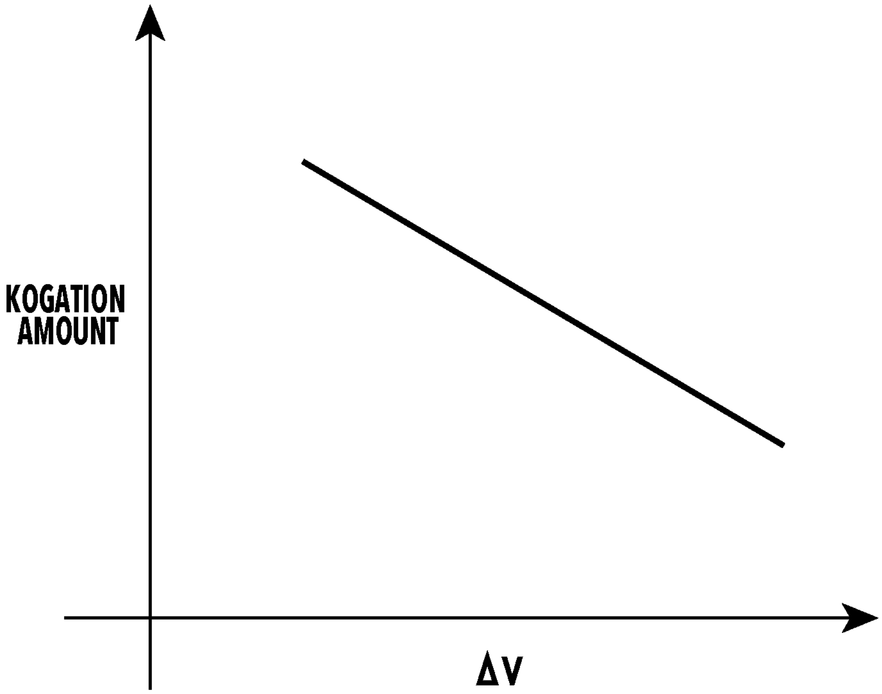
FIG. 17 is a relationship between ΔV and a kogation amount on a heater upper protection layer in a first embodiment.

In the present embodiment, the aforementioned mechanism achieves the following relationship: the larger the potential difference ΔV (=Vc−Vh) in the case where the potential of the opposing electrode is represented by Vc and the potential of the upper protection layer electrode of the heater is represented by Vh is, the more the particles 141 that are charged to a negative potential and that cause kogation are repelled and the smaller the kogation amount is. The relationship between ΔV and the kogation amount in the present embodiment is as illustrated in FIG. 17.

However, in the aforementioned head configuration, in the case where aging in an initial stage is executed with the potential difference between the opposing electrode 129 and the electrode 121 of the upper protection layer being a potential difference at which kogation is less likely to be formed as in the printing, kogation is less likely to be formed on the upper protection layer 124 and the ejection characteristics of the ink is less likely to change. Accordingly, in this case, as a result of an increase in time of the aging in the initial stage, there occurs a problem of an increase in downtime and an increase in wasted ink.

Figure 14C:
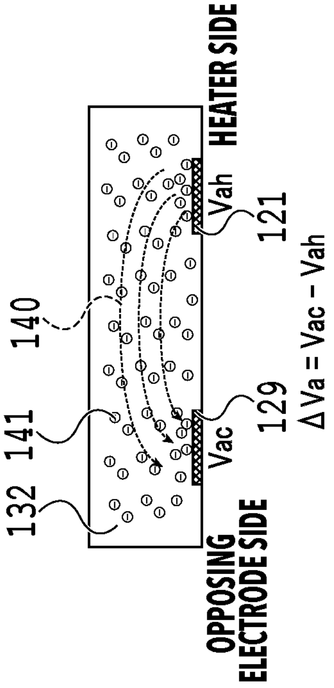

The present embodiment provides a method for solving such a problem. In detail, in the case where a potential difference in the printing is represented by ΔVp and a potential difference in the aging is represented by ΔVa, such conditions that ΔVp≥0 and ΔVa<ΔVp are satisfied as illustrated in FIGS. 14B and 14C. Note that ΔVp=potential Vpc of the opposing electrode in the printing−potential Vph of the upper protection layer electrode of the heater in the printing and ΔVa=potential Vac of the opposing electrode in the aging−potential Vah of the upper protection layer electrode of the heater in the aging. In the case where ΔVa (smaller than ΔVp) is employed as the potential difference in the aging, kogation is more likely to be formed on the upper protection layer of the heater than in the case where ΔVp is employed (see FIG. 17).

According to the aforementioned method, in the aging, the presence ratio of the particles charged to a negative potential near the surface of the upper protection layer 124 of the heater is higher than that in the printing, and kogation is thus more likely to be formed on the upper protection layer 124. The number of times the heating resistive element 126 needs to be driven until the resistance value of the heating resistive element 126 becomes stable can be thereby reduced and an aging period (time required until the ejection speed becomes stable) can be reduced. Note that FIG. 14C illustrates the case where ΔVa<0. Setting ΔVa smaller than 0 in the aging as in FIG. 14C causes the particles charged to a negative potential to be attracted to the surface of the upper protection layer 124. As a result, kogation is more likely to be formed and the aging period can be further reduced.

Figure 16A:
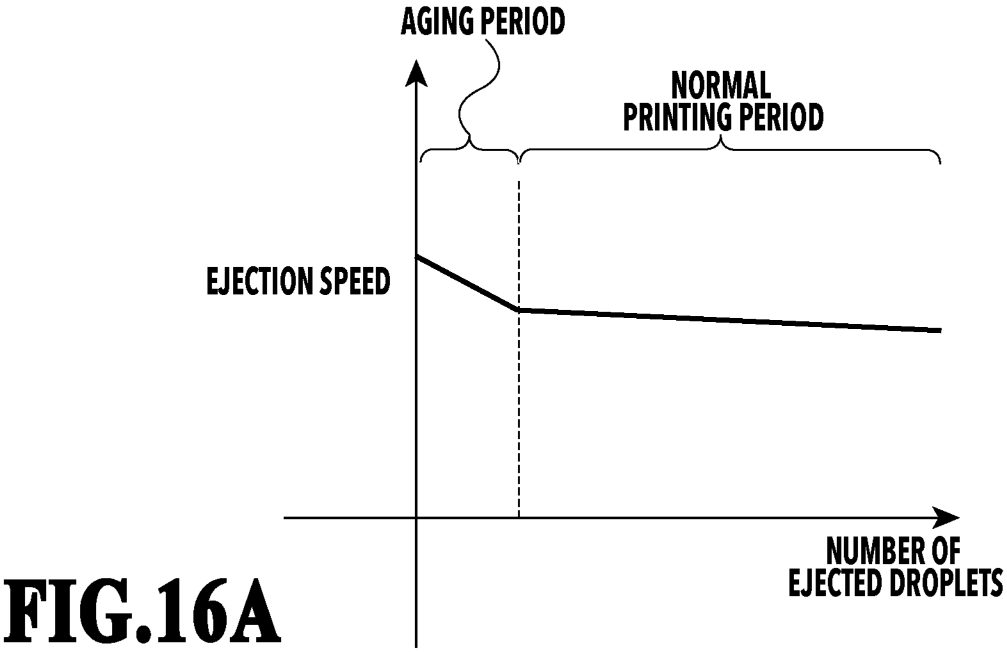
FIGS. 16A and 16B are relationships between the number of ejected droplets and ejection speed.
Figure 16B:
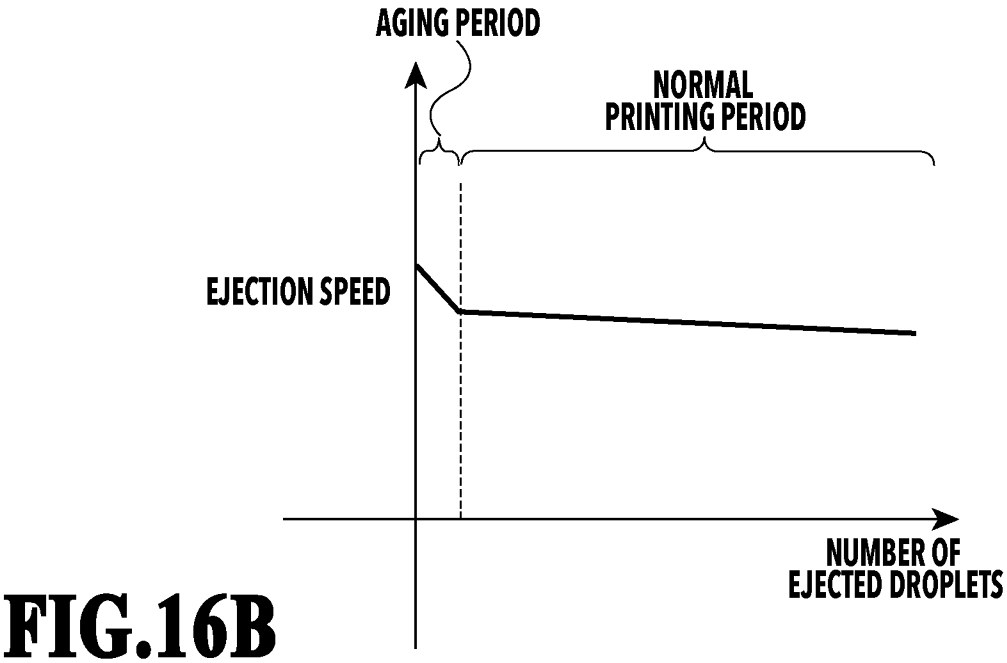

FIGS. 16A and 16B are referred to. FIG. 16A is a graph illustrating an ejection speed change in an initial stage in the case where aging is performed with the same potential difference ΔVp (note that ΔVp>0, specifically +0.5 to 2.5 V) as that in the printing employed as the potential difference between the potential of the upper protection layer electrode of the heater and the potential of the opposing electrode. The ejection speed change in the initial stage described herein refers to, for example, an ejection speed drop of about 5 to 10% from that before the execution of aging, at a point where the number of times of ejection in the aging is about 1×10^7. Meanwhile, FIG. 16B is a graph illustrating an ejection speed change in the case where the potential difference ΔVa (ΔVa<ΔVp) smaller than the potential difference in the printing is employed in the aging and then ΔVp is employed in the following printing as the potential difference between the potential of the upper protection layer electrode of the heater and the potential of the opposing electrode.

As illustrated in FIG. 16A, in the case where the same potential difference as that in the printing is employed also in the aging, kogation is not rapidly formed on the heater. Accordingly, the number of times of ejection required to make the ejection speed stable increases and the aging period increases. Meanwhile, as illustrated in FIG. 16B, in the case where the potential difference ΔVa (ΔVa<ΔVp) smaller than the potential difference in the printing is employed in the aging, a rapid ejection speed change in the initial stage can be achieved. Accordingly, it is possible to reduce the number of times of ejection required to complete the aging and reduce time to completion of the aging This can reduce the downtime and the amount of wasted ink while suppressing shortening of the life of the heating resistive element 126. Moreover, since the potential difference is set to ΔVp in the printing after the aging, the heater returns to the state where kogation is less likely to be formed in the case where the printing period is long, and it is possible to cause the ejection speed to hardly change and suppress image deterioration. Note that the ejection speed change in the initial stage at the potential difference ΔVa in the aging described herein refers to, for example, a steep ejection speed drop of about 5 to 10% from that before the execution of aging, at a point where the number of times of ejection in the aging is about 5×10ˆ6.

In the present embodiment, as a method of changing the potential difference ΔV between the potential of the upper protection layer electrode of the heater and the potential of the opposing electrode, both or either one of the potential of the upper protection layer electrode of the heater and the potential of the opposing electrode may be changed. Note that, in a configuration in which the potential difference ΔV can be changed by changing the potential of one of the electrodes, a circuit configuration can be simplified and this configuration is thus advantageous in terms of cost.

Moreover, a timing at which aging is performed on the upper protection layer of the heater includes, in addition to the case where the recording apparatus is new and has no ejection history, the case where kogation is deposited on the upper protection layer and kogation removal is performed after the start of the use of the recording apparatus. The kogation removal is an operation in which voltage is applied between the electrode 121 of the upper protection layer and the opposing electrode 129 through the liquid to cause electrochemical reaction between the electrode 121 and the liquid and the material forming the upper protection layer is made to dissolve into the liquid to remove kogation attached to the upper protection layer. For example, in the case where iridium is used for the upper protection layer, the kogation removal can be performed by setting the potential of the upper protection layer +2.5 V or higher than the potential of the opposing electrode.

The timing of aging also includes the case where a kogation state of a heater upper layer of a target nozzle is such a state that kogation is less than that in nozzles around the target nozzle. Note that, regarding the state of the recording apparatus, since the state where the recording apparatus is new without ejection history is different from the state after execution of the kogation removal in usage, the kogation amount on the upper protection layer of the heater often varies between these states. Accordingly, ΔVa used in the case where there is no ejection history may be different from ΔVa used in the case where the kogation removal is executed.

Moreover, control of the kogation amount in the aging is preferably managed by using the number of ejected droplets (also referred to as dot count).

Note that, as a method of determining whether or not the aging is appropriately performed, there is, for example, a method in which an image with even density is test-printed and the density of an outputted product is checked. A density sensor provided in the recording apparatus main body may be used as a density checking unit or the density may be visually checked.

<Control of Communication Between Liquid Ejection Head and Main Body>

Figure 20:
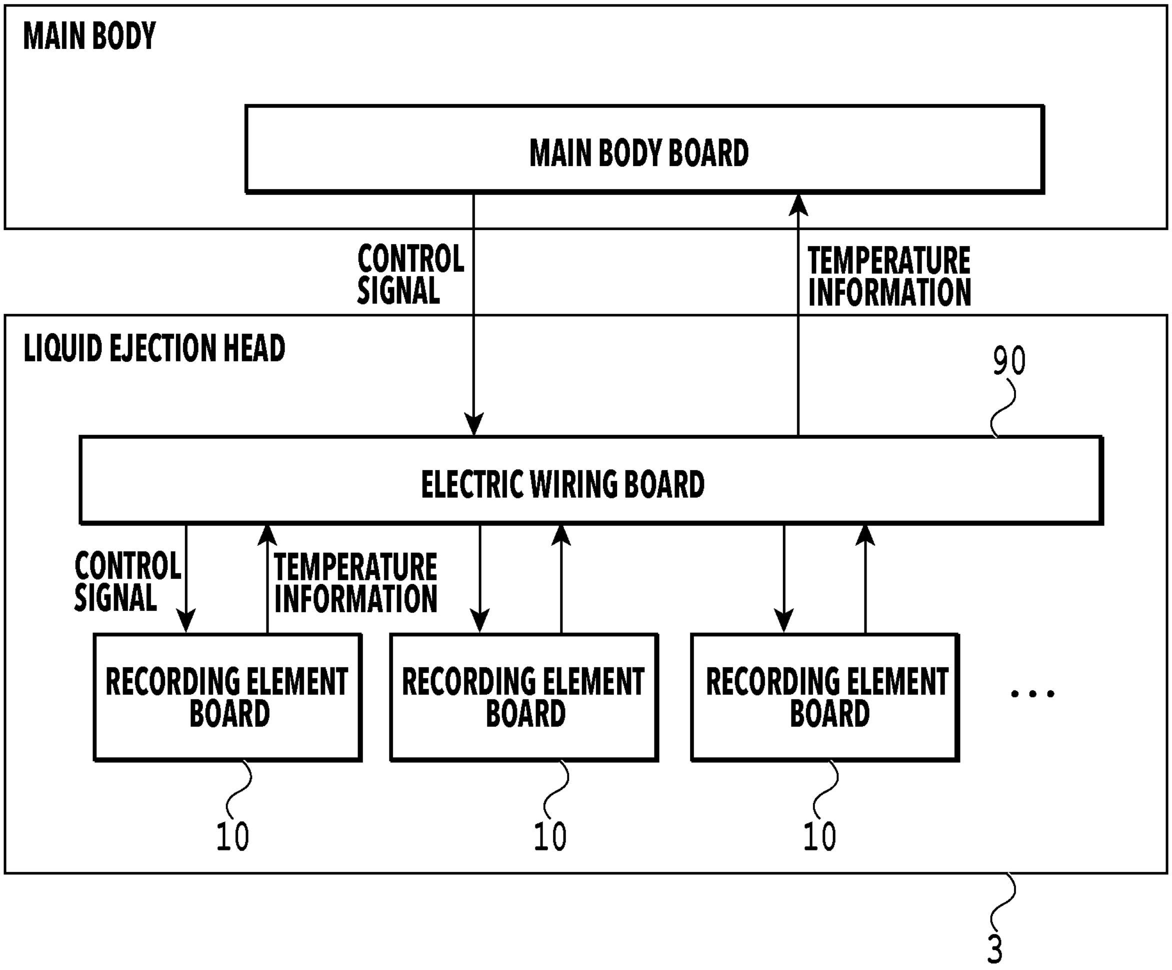
FIG. 20 is a diagram modeling communication between the liquid ejection head and a main body.

Control of communication between the liquid ejection head and the main body according to the present embodiment is described below by using FIG. 20. FIG. 20 is a diagram modeling the communication between the liquid ejection head and the main body. A main body board incorporated in the main body of the recording apparatus 1000 includes a CPU, a ROM, a RAM, and the like. Such a main body board receives information on temperature in each recording element board 10 from the liquid ejection head 3 and sends a control signal for driving the recording element board 10 to the electric wiring board 90 of the liquid ejection head 3, based on the received temperature information.

<Flow of Series of Processes>

Figure 21:
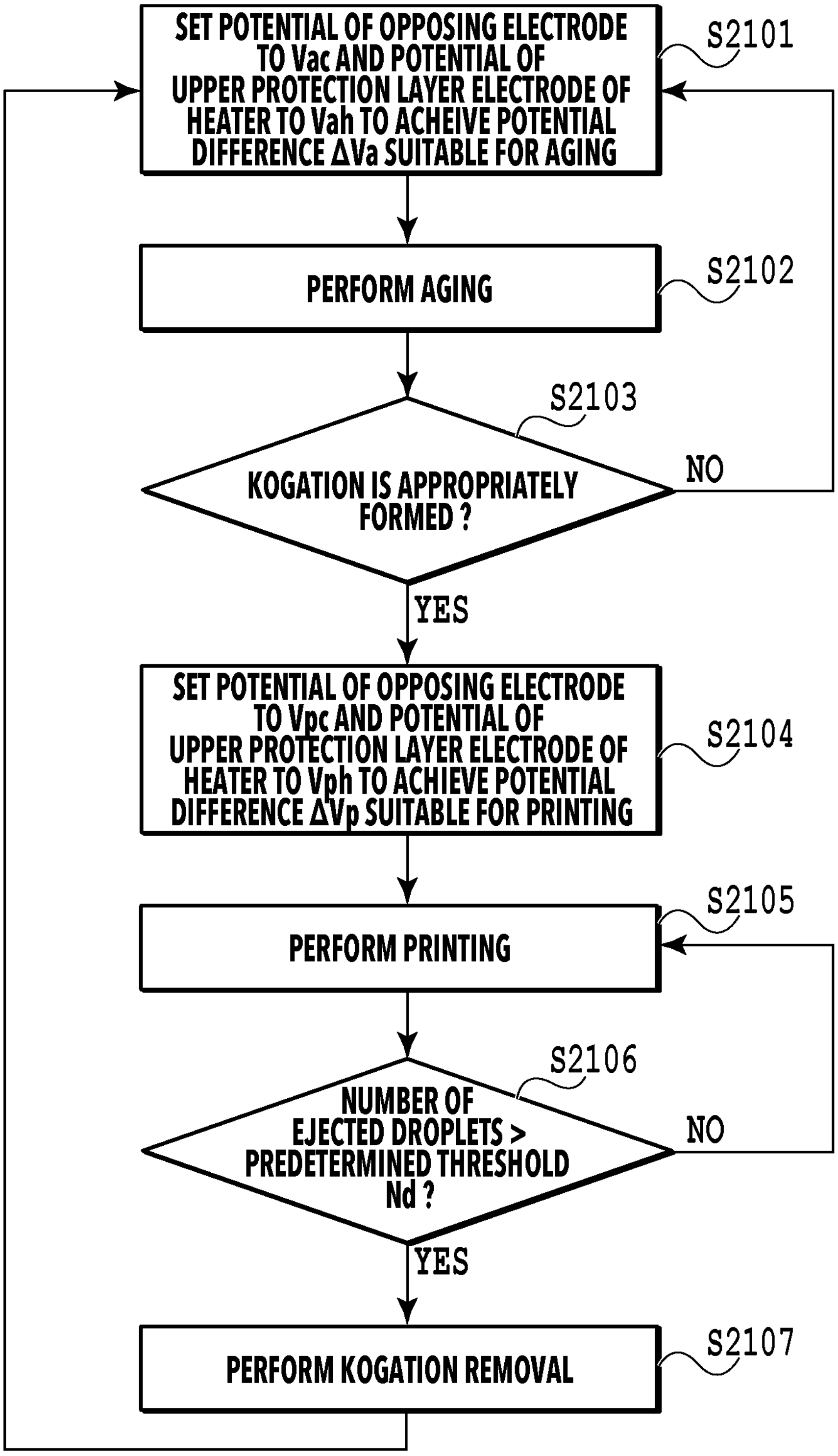
FIG. 21 is a flowchart of a process in the first embodiment.

Next, FIG. 21 is referred to. FIG. 21 is a flowchart illustrating a flow of an example of a series of processes in the present embodiment. In this series of processes, aging is performed on the liquid ejection head that is included in the recording apparatus and that is new without ejection history and printing is performed after the aging. Thereafter, in the case where the number of ejected droplets reaches a predetermined threshold, kogation removal is performed on the upper protection layer of the heater and then aging is performed again. Each step is described below in detail.

In the case where a new liquid ejection head without ejection history is attached to the recording apparatus main body, in step S2101, the CPU of the recording apparatus 1000 sets the potential of the upper protection layer electrode of the heater to Vah and the potential of the opposing electrode to Vac to achieve the potential difference ΔVa optimal for the aging in initial stage. Note that, in the following description, "step S" is abbreviated as "S".

In S2102, the CPU of the recording apparatus 1000 performs aging.

In S2103, the CPU of the recording apparatus 1000 determines whether kogation is appropriately formed on the upper protection layer of the heater. In the case where the determination result of the present step is true, the processing proceeds to S2104. Meanwhile, in the case where the determination result is false, the processing returns to S2101. Note that, in the present step, the density of an outputted product obtained by test printing is checked to obtain measured density as described above and the determination is made based on whether or not the measured density is within a predetermined range. Specifically, kogation is assumed to be appropriately formed in the case where the measured density is within the predetermined range.

In S2104, the CPU of the recording apparatus 1000 sets the potential of the upper protection layer electrode of the heater to Vph and the potential of the opposing electrode to Vpc to achieve the potential difference ΔVp suitable for the printing.

In S2105, the CPU of the recording apparatus 1000 performs a printing process.

In S2106, the CPU of the recording apparatus 1000 determines whether the number of ejected droplets is larger than a predetermined threshold (represented by Nd). In the case where the determination result of the present step is true, the CPU of the recording apparatus 1000 assumes that the kogation amount on the upper protection layer of the heater has exceeded an allowable amount, and proceeds to S2107. Meanwhile, in the case where the determination result of the present step is false, the processing returns to S2105 and printing is continuously performed in the same setting.

In S2107, the CPU of the recording apparatus 1000 performs the kogation removal.

After the kogation removal in S2107, kogation on the upper protection layer of the heater is removed and the upper protection layer is in a state where there is almost no kogation. Thus, the processing proceeds to S2101 and to S2102. Specifically, the aging is performed again. Note that, as the value of the potential difference ΔVa in the aforementioned second aging and beyond, a value different from that in the aging in initial stage performed on the new head without ejection history may be used as described above.

Note that it is necessary to be careful about how the potential difference is changed from the potential difference ΔVa in the aging to the potential difference ΔVp in the printing. In detail, a rapid potential change may cause a rapid change in a way kogation is formed on the upper protection layer of the heater (for example, kogation formed during the aging suddenly detaches or a similar situation occurs). This may cause the ejection characteristics to change and cause defects such as image unevenness. In order to prevent such defects, ΔVa is preferably brought closer to ΔVp stepwise as the number of droplets ejected in the aging increases.

Moreover, in order to further accelerate the ejection change by the aging, a pulse with a higher voltage value than the voltage pulse in a normal situation such as recording may be applied at such a degree that the heater material is not damaged. Moreover, the pulse may be applied for longer time in the aging than time at which the pulse is applied in the normal situation.

Furthermore, the liquid ejection head in the present embodiment is a head that performs printing by using the inks of four colors of CMYK (cyan, magenta, yellow, and black) and the aging does not have to be performed for colors in which formation of kogation is less likely to occur. Moreover, since the ink colors include colors in which formation of kogation is likely to occur and colors in which formation of kogation is less likely to occur, the values of ΔVa and ΔVp do not have to be uniform across all ink colors and the combination of values may vary among the ink colors.

Second Embodiment

<Structure of Heat Applying Portion in Recording Element Board>

Figure 18:
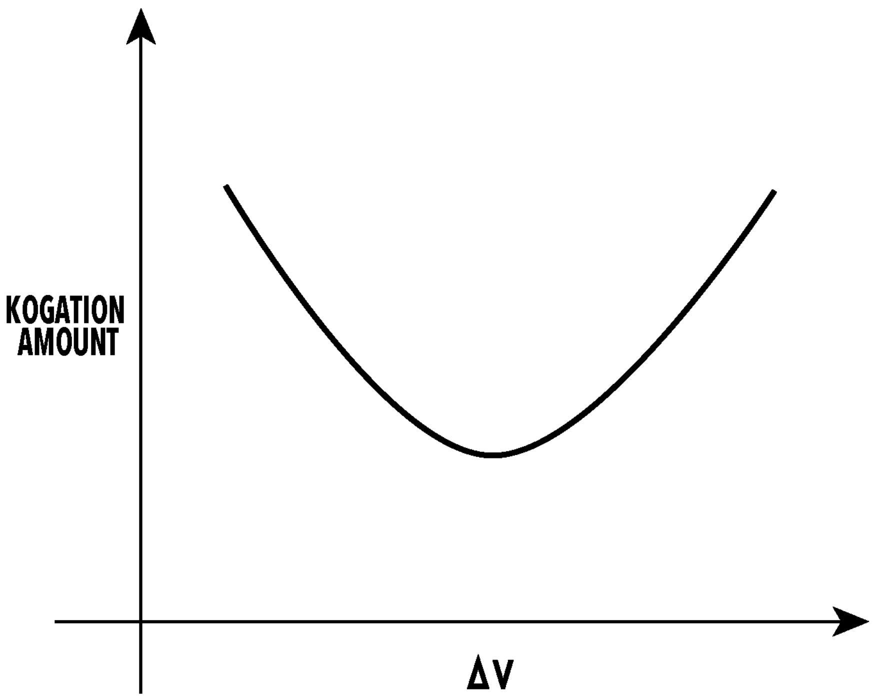
FIG. 18 is a relationship between ΔV and the kogation amount on the heater upper protection layer in a second embodiment.

A second embodiment is a mode handling a case where the kogation amount on the upper protection layer of the heater has a local minimum value in a relationship with the potential difference ΔV (=Vc−Vh) between the potential Vc of the opposing electrode and the potential Vh of the upper protection layer electrode of the heater as illustrated in FIG. 18. Note that, in the following description, differences from the first embodiment are mainly described and description of the same contents as the first embodiment is omitted as appropriate.

As described in the first embodiment, since particles that cause kogation are mostly negatively-charged particles, a relationship between the potential and kogation should be such that the more relatively-negative the potential of the upper protection layer electrode of the heater is, the less likely the particles 141 charged to a negative potential are attracted around the heater and the less likely the kogation is formed. In spite of this, the kogation amount on the upper protection layer of the heater has a local extreme value as illustrated in FIG. 18 and one of the reasons for this is assumed to be deposition of kogation on the opposing electrode side.

Specifically, the more relatively negative the potential of the upper protection layer electrode of the heater is, the more relatively positive the potential of the opposing electrode is. Accordingly, the negatively-charged particles 141 are more likely to be attracted toward the opposing electrode and kogation is more likely to be formed on the opposing electrode. As a result, a deposition attached to the opposing electrode insulates the opposing electrode and the ink from each other, the electric field gradually approaches zero, and a state where no potential control functions is established. Accordingly, in the case where ΔV is increased, the kogation amount increases. The kogation amount is assumed to have a local minimum value as illustrated in FIG. 18 due to such a reason.

In view of this, the present embodiment is characterized in that the potential difference satisfies ΔVp>0 and ΔVa>ΔVp.

In detail, the potential difference ΔVp between the potential of the opposing electrode and the potential of the upper protection layer electrode of the heater in the printing is preferably set to a value at which deposition of kogation is small even if the value is used for a long period, that is to a value at which the kogation amount takes the local minimum value. Meanwhile, the potential difference ΔVa between the potential of the opposing electrode and the potential of the upper protection layer electrode of the heater in the aging is preferably set to a value larger than the value of ΔVp at which the kogation amount takes the local minimum value (ΔVa>ΔVp).

Third Embodiment

<Structure of Heat Applying Portion in Recording Element Board>

Figure 19:
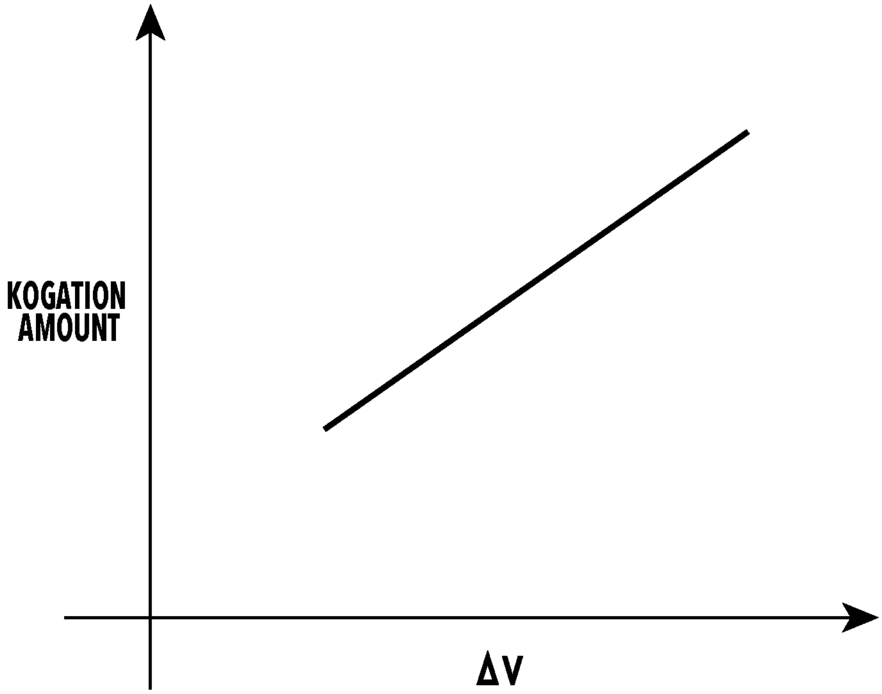
FIG. 19 is a relationship between ΔV and the kogation amount on the heater upper protection layer in a third embodiment.

A third embodiment is a mode handling a case where the kogation amount on the upper protection layer of the heater monotonically increases in a relationship with the potential difference ΔV (=Vc−Vh) between the potential Vc of the opposing electrode and the potential Vh of the upper protection layer electrode of the heater as illustrated in FIG. 19. Note that, in the following description, differences from the first embodiment are mainly described and description of the same contents as the first embodiment is omitted as appropriate.

Figure 15A:
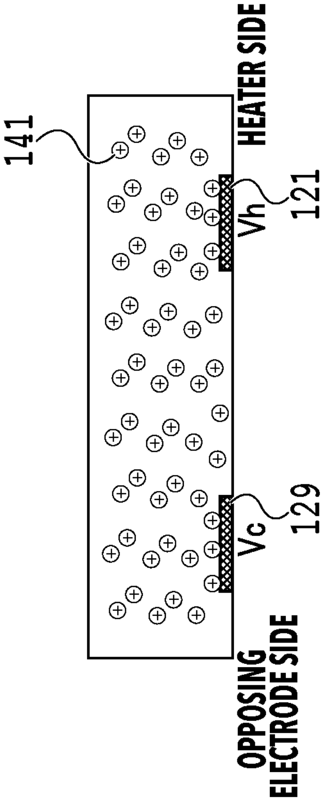
FIGS. 15A to 15C are explanatory views of a kogation suppression process in the case where positively-charged particles are the main cause of kogation.
Figure 15B:
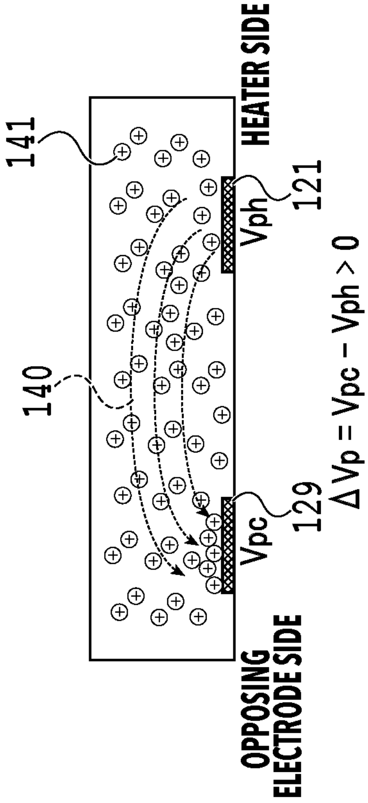

As described in the first embodiment, the particles that cause kogation are negatively-charged particles in most cases but are positively-charged particles in rare cases. In this case, as illustrated in FIGS. 15A and 15B, the more relatively-negative the potential of the upper protection layer electrode of the heater is, the more likely the positively-charged particles are attracted onto the upper protection layer of the heater and the more likely the kogation is formed on the upper protection layer of the heater.

In view of this, the present embodiment is characterized in that the potential difference satisfies ΔVp<0 and ΔVa>ΔVp.

Figure 15C:
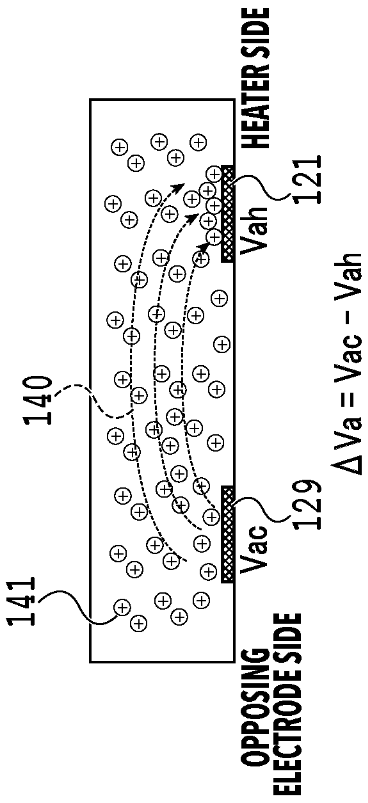

In detail, the potential difference ΔVp between the potential of the opposing electrode and the potential of the upper protection layer electrode of the heater in the printing is preferably set to a value at which deposition of kogation is small even if the value is used for a long period, that is set as small as possible such that ΔVp<0. Meanwhile, the potential difference ΔVa between the potential of the opposing electrode and the potential of the upper protection layer electrode of the heater in the aging is preferably set to a value larger than the value of ΔVp at which kogation is less likely to occur (preferably set such that ΔVa>ΔVp). Although FIG. 15C illustrates the case where ΔVa is larger than 0, ΔVa may be equal to or smaller than 0.

OTHER EMBODIMENTS

Regarding the potential difference between the potential of the upper protection layer electrode of the heater and the potential of the opposing electrode, the modes in which the potential difference ΔVa in the aging is varied from the potential difference ΔVp in the printing are described in the aforementioned embodiments. In this case, the potential of each electrode may be set to any potential. Specifically, the potential of the upper protection layer electrode of the heater may be fixed (Vah=Vph). Alternatively, the potential of the opposing electrode may be fixed (Vac=Vpc).

Moreover, values of all of Vac, Vah, Vpc, and Vph may be 0 or larger.

Note that the contents of the first to third embodiments may be used in combination as appropriate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to quickly complete aging while suppressing damage to the heater material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-146463, filed Sep. 8, 2021, which is hereby incorporated by reference wherein in its entirety.

What is claimed is:

1. A liquid ejection apparatus comprising:

a liquid ejection head including a heating element that generates energy required to eject liquid, a first protection layer that blocks contact between the heating element and the liquid, a second protection layer that partially covers the first protection layer and functions as a first electrode, a second electrode that is electrically connected to the first electrode through the liquid, and an ejection port that ejects the liquid; and a control unit configured to perform control of setting a potential difference between the first electrode and the second electrode to a predetermined value in each of aging and printing by changing at least one of potentials of the first electrode and the second electrode, wherein a formula (1) is satisfied in the case where the potential of the first electrode in the aging is represented by Vah, the potential of the second electrode in the aging is represented by Vac, and the potential difference between the potential Vah of the first electrode and the potential Vac of the second electrode is represented by ΔVa (=Vac−Vah), and the potential of the first electrode in the printing is represented by Vph, the potential of the second electrode in the printing is represented by Vpc, and the potential difference between the potential Vph of the first electrode and the potential Vpc of the second electrode is represented by as ΔVp (=Vpc−Vph)

$$\Delta Va \neq \Delta Vp \quad \text{formula (1).}$$

2. The liquid ejection apparatus according to claim 1, wherein a formula (2) is satisfied $$\Delta Va < \Delta Vp \quad \text{formula (2).}$$

3. The liquid ejection apparatus according to claim 1, wherein a formula (3) is satisfied $$\Delta Vp \geq 0 \quad \text{formula (3).}$$

4. The liquid ejection apparatus according to claim 1, wherein a formula (4) is satisfied $$\Delta Va > \Delta Vp \quad \text{formula (4).}$$

5. The liquid ejection apparatus according to claim 4, wherein a formula (5) is satisfied $$\Delta Vp \geq 0 \quad \text{formula (5).}$$

6. The liquid ejection apparatus according to claim 4, wherein a formula (6) is satisfied $$\Delta Vp < 0 \quad \text{formula (6).}$$

7. The liquid ejection apparatus according to claim 6, wherein a formula (7) is satisfied $$\Delta Va \leq 0 \quad \text{formula (7).}$$

8. The liquid ejection apparatus according to claim 6, wherein a formula (8) is satisfied $$\Delta Va > 0 \quad \text{formula (8).}$$

9. The liquid ejection apparatus according to claim 1, wherein a formula (9) is satisfied $$Vah = Vph \quad \text{formula (9).}$$

10. The liquid ejection apparatus according to claim 1, wherein a formula (10) is satisfied $$Vac = Vpc \quad \text{formula (10).}$$

11. The liquid ejection apparatus according to claim 1, wherein the second protection layer is made of a material that contains a metal which dissolves by electrochemical reaction and that forms no oxidized film hindering dissolution by being heated.

12. The liquid ejection apparatus according to claim 1, wherein a formula (11) and a formula (12) are satisfied $$|\Delta Va| \leq 2.5\ \text{V} \quad \text{formula (11)}$$

$$|\Delta Vp| \leq 2.5\ \text{V} \quad \text{formula (12).}$$

13. The liquid ejection apparatus according to claim 1, wherein values of all of Vac, Vah, Vpc, and Vph are 0 or larger.

14. The liquid ejection apparatus according to claim 1, wherein the aging is performed after kogation removal is performed.

15. The liquid ejection apparatus according to claim 1, further comprising a determination unit that determines whether or not kogation removal is to be performed after the printing based on the number of ejected droplets.

16. A control method of a liquid ejection apparatus including:

a liquid ejection head including a heating element that generates energy required to eject liquid, a first protection layer that blocks contact between the heating element and the liquid, a second protection layer that partially covers the first protection layer and functions as a first electrode, a second electrode that is electrically connected to the first electrode through the liquid, and an ejection port that ejects the liquid; and a control unit configured to perform control of setting a potential difference between the first electrode and the second electrode to a predetermined value in each of aging and printing by changing at least one of potentials of the first electrode and the second electrode, the control method comprising:

satisfying a formula (13) in the case where the potential of the first electrode in the aging is represented by Vah, the potential of the second electrode in the aging is represented by Vac, and the potential difference between the potential Vah of the first electrode and the potential Vac of the second electrode is represented by ΔVa (=Vac−Vah), and the potential of the first electrode in the printing is represented by Vph, the potential of the second electrode in the printing is represented by Vpc, and the potential difference between the potential Vph of the first electrode and the potential Vpc of the second electrode is represented by ΔVp (=Vpc−Vph)

$$\Delta Va \neq \Delta Vp \quad \text{formula (13)}.$$

* * * * *